US010459119B2

(12) United States Patent
Kuhns

(10) Patent No.: US 10,459,119 B2
(45) Date of Patent: Oct. 29, 2019

(54) SYSTEM AND METHOD FOR PREDICTING SUNSET VIBRANCY

(71) Applicant: Matthew Kuhns, Irvine, CA (US)

(72) Inventor: Matthew Kuhns, Irvine, CA (US)

( * ) Notice: Subject to any disclaimer, the term of this patent is extended or adjusted under 35 U.S.C. 154(b) by 945 days.

(21) Appl. No.: 14/981,537

(22) Filed: Dec. 28, 2015

(65) Prior Publication Data

US 2017/0109634 A1 Apr. 20, 2017

Related U.S. Application Data

(60) Provisional application No. 62/097,001, filed on Dec. 26, 2014.

(51) Int. Cl.
*G01W 1/10* (2006.01)

(52) U.S. Cl.
CPC ................... *G01W 1/10* (2013.01)

(58) Field of Classification Search
CPC .......... G06N 5/04; G06N 5/02; G06N 99/005; G09B 7/04; G06F 9/4446
USPC .......................................................... 706/11
See application file for complete search history.

(56) References Cited

U.S. PATENT DOCUMENTS

| 4,992,942 | A | * | 2/1991 | Bauerle | A01G 31/00 700/284 |
| 6,085,152 | A | * | 7/2000 | Doerfel | G01S 7/003 702/3 |
| 8,332,429 | B2 | * | 12/2012 | Poirier | G06F 17/30241 707/781 |
| 8,515,270 | B1 | * | 8/2013 | Posehn | G03B 15/00 396/48 |
| 2011/0025868 | A1 | * | 2/2011 | Tillotson | G01N 21/4133 348/222.1 |
| 2012/0147030 | A1 | * | 6/2012 | Hankers | G01W 1/00 345/619 |
| 2014/0149038 | A1 | * | 5/2014 | Cronin | G01W 1/10 702/3 |
| 2014/0354768 | A1 | * | 12/2014 | Mei | H04N 5/23222 348/36 |
| 2015/0007080 | A1 | * | 1/2015 | Nama | G06F 3/0484 715/771 |
| 2015/0010200 | A1 | * | 1/2015 | Kawahara | G01W 1/02 382/100 |

(Continued)

OTHER PUBLICATIONS

Aviation Weather Services—2007—https://www.faa.gov/documentLibrary/media/Advisory_Circular/AC-0045F.pdf (Year: 2007).*

*Primary Examiner* — Scott A. Waldron
*Assistant Examiner* — Viker A Lamardo
(74) *Attorney, Agent, or Firm* — Eric Karich; Karich & Associates

(57) ABSTRACT

A sunset prediction system performs the steps of determining a location of interest, and collecting weather forecast data at or around the time of either sunrise or sunset, at the location and a surrounding area adjacent the location. The collected weather forecast data includes cloud density and cloud altitude. The sun prediction system then determines from the collected weather forecast data whether there will be clouds at the location that are advantageous for photography at or around the time of sunrise or sunset, and whether the sunlight will be obstructed by obstructing clouds in the surrounding area. A forecast rating is then reported so that the user can determine whether to plan photography at the location.

19 Claims, 28 Drawing Sheets

(56) References Cited

U.S. PATENT DOCUMENTS

| | | | |
|---|---|---|---|
| 2015/0138355 A1* | 5/2015 | Tillotson | G01N 15/06 348/144 |
| 2015/0342005 A1* | 11/2015 | Akcasu | H05B 37/0209 315/307 |
| 2016/0142626 A1* | 5/2016 | Bostick | H04N 5/23222 348/207.11 |
| 2017/0300840 A1* | 10/2017 | Rainey | G06Q 50/26 |

* cited by examiner

SYSTEM AND METHOD FOR PREDICTING SUNSET VIBRANCY

CROSS-REFERENCE TO RELATED APPLICATIONS

This application for a utility patent claims the benefit of U.S. Provisional Application No. 62/097,001, filed Dec. 26, 2014.

BACKGROUND OF THE INVENTION

Field of the Invention

This Invention relates to the forecasting of natural light conditions relating to weather, and more particularly to forecasting conditions for photography around the time of sunrise and sunset in advance, up to several days, of the desired photographic moment.

Description of Related Art

The concept of clouds leading to photogenic sunsets (clouds with reflected sunlight on them or filtered through them and typically warm in tone such as reds and oranges) is well known; however, the details of predicting the vibrancy of sunset colors based on weather data has long been considered too complicated a problem to accurately solve.

Current services in this field simply state that if it is partly cloudy in the traditional weather forecast then there will be a chance of a nice sunset; however, this is a simplistic approach filled with inaccuracy. Sunset forecasting is more nuanced than just there being some clouds and therefore this method does not reliably predict sunset vibrancy with any reasonable certainty or repeatability. As a result of this complexity, existing services limit their forecast to whether or not their will either be any clouds at all, and additionally if it will be partly cloudy, which in the weather forecasting terminology means around 50% cloud cover. Any additional complexity in the forecast to increase accuracy is disregarded from the analysis and thus the forecast is not very accurate.

The system takes a more scientific approach to forecast good light, wherein the method constructs a three dimensional model of the atmosphere and surrounding terrain in order to apply light path mapping, offsets, and masking to accurately determine if there will be cloud color. This allows the model to take into account multiple cloud heights and densities, haze, rain, complex weather situations, terrain, local adjustments, and over the horizon factors which lead to accurate forecasts which are statistically repeatable.

SUMMARY OF THE INVENTION

The present invention teaches certain benefits in construction and use which give rise to the objectives described below.

The present invention provides a sunset prediction system for forecasting conditions for photography around the time of sunrise or sunset. The sunset prediction system includes a computer system that performs the steps of determining a location of interest, and collecting weather forecast data at or around the time of either sunrise or sunset, at the location and a surrounding area adjacent the location. The collected weather forecast data includes cloud density and cloud altitude. A direction of sunlight at or around the time of sunrise or sunset is determined. The sun prediction system then determines from the collected weather forecast data whether there will be clouds at the location that are advantageous for photography at or around the time of sunrise or sunset; and whether the sunlight will be obstructed by obstructing clouds in the surrounding area between the sun and the clouds at the location. This enables the computer system to determine a forecast rating of forecast conditions for photography at or around the time of sunrise or sunset based upon the clouds at the location and the presence of any obstructing clouds. The forecast rating is then reported so that the user can determine whether to plan photography at the location.

A primary objective of the present invention is to provide a sunset prediction system having advantages not taught by the prior art.

Another objective is to provide a sunset prediction system which provides individualized and location specific forecasts of photogenic light reflected off clouds at sunrise and sunset.

Another objective is to provide a system for forecasting the color of light reflected off clouds at sunrise and sunset.

Another objective is to provide a system for displaying the forecasts as a rating that represents the likelihood of photogenic light or cloud cover relative to the expected conditions.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, a system and method for predicting sunset vibrancy. The system and method are used to forecast natural light conditions relating to weather, to determine times of optimum conditions for photography around the time of sunrise and sunset, in advance up to several days of the desired photographic moment.

Figure 1:
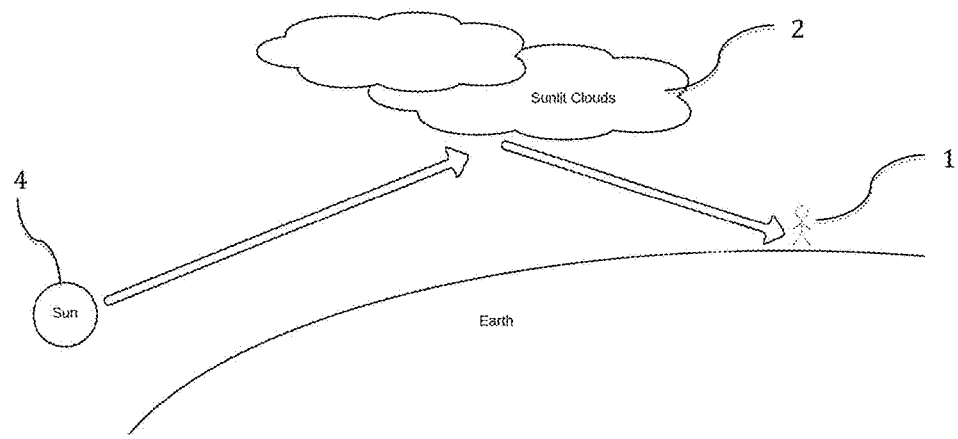
FIG. 1 is a diagram showing sunlit clouds relative to an observer and a sun position, with no clouds blocking sunlight from illuminating the underside of clouds adjacent the observer.

FIG. 1 is a diagram showing an observer 1 and adjacent clouds 2, illustrating how the sun 4 is able to illuminate the underside of the adjacent clouds 2. As shown in FIG. 1, when there are no clouds between the sun and the adjacent clouds 2, sunlight is able to illuminate the underside of the adjacent clouds 2, thereby providing a fiery sunset which is desirable for photography. The observer 1 is at a location of interest. This location is determined and used in the method steps for forecasting the light conditions, as described in greater detail below.

Figure 2:
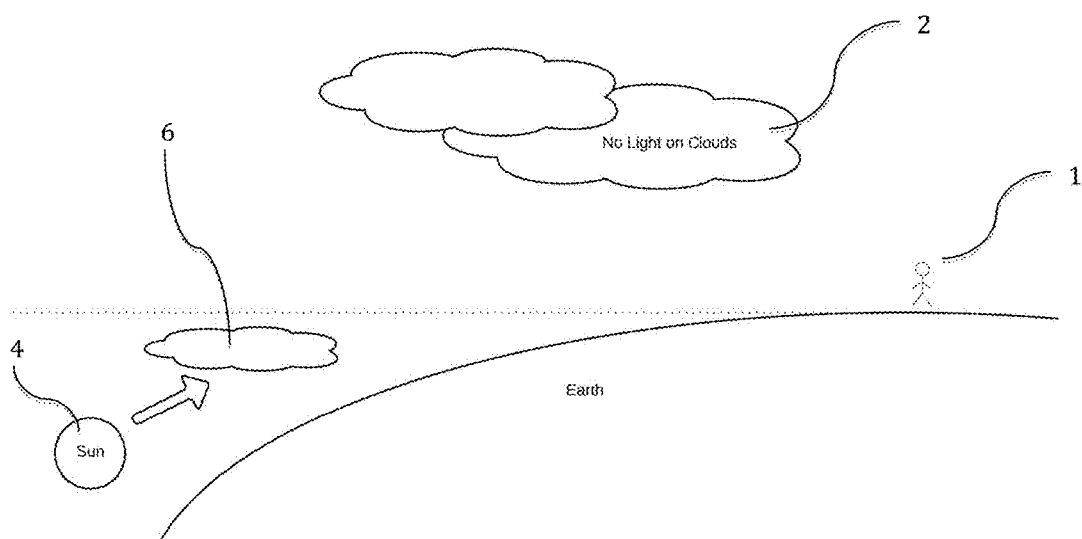
FIG. 2 is a diagram showing obstructing clouds, which may be over the horizon that the observer cannot see, which block sunlight from illuminating the underside of clouds adjacent the observer.

FIG. 2 is a diagram showing obstructing clouds 6 which block sunlight from illuminating the underside of the adjacent clouds 2 near the observer 1. When obstructing clouds 6 are present, photographic conditions are typically poor. It is important to note that the obstructing clouds 6 may be over the horizon, so that the observer 1 cannot even see them, but they nonetheless can significantly alter the photographic conditions at the location, despite their distant location.

Figure 3:
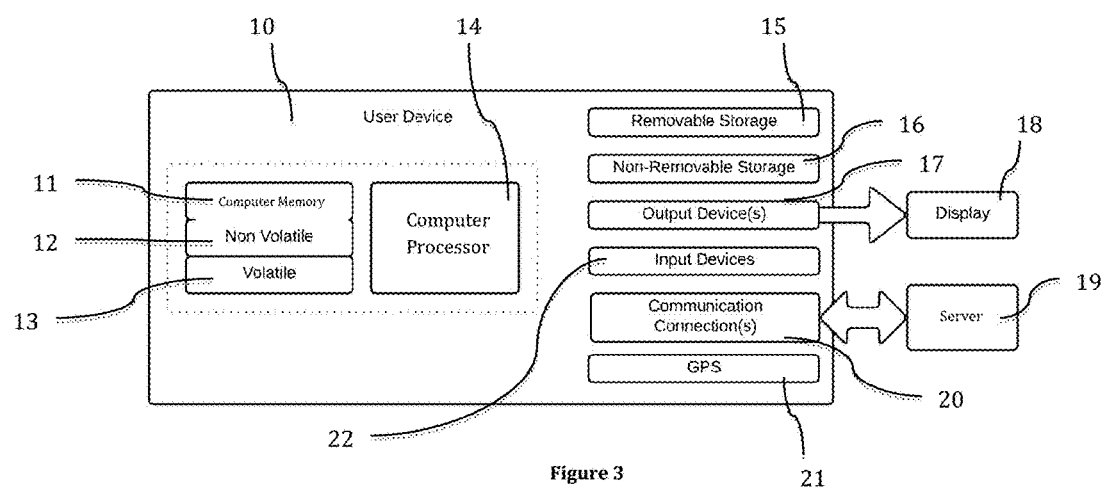
FIG. 3 is a block diagram of a representative user device configuration on which the method of the invention can run.

FIG. 3 is a block diagram of a representative user device 10 which may be used in the execution of the sunset prediction system. The user device 10 may be in the form of a smart phone, tablet, laptop, PC, or any other form of computer device known in the art. In this embodiment, as shown in FIG. 3, the user device includes a computer processor 14, a computer memory 11 consisting of non volatile 11 and volatile 12 memory. The user device 10 also consist removable storage 15 and non removable storage 16 which may store results or programs. The output device 17 may be connected to a display 18 or another interface device which allows the user to view the forecast. Input devices 22 are used to interface with the user device 10. The communication connection 20 allows connection to a server 19 to assist in the forecast. The user device ascertains its position via a GPS 21 which can be used to customize the forecast for the user.

For purposes of this application, the term "computer memory" is hereby defined to include any tangible storage that participates in providing instructions to a processor for execution Such a medium may take many forms, including but not limited to, non-volatile media, volatile media, transmission media, and any other equivalent mechanisms known to those skilled in the art for the operation of computers. Non-volatile media includes, for example, NVRAM, or magnetic or optical disks. Volatile media includes dynamic memory, such as main memory. The computer memory is non-transient, and may include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer memory is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

Figure 4:
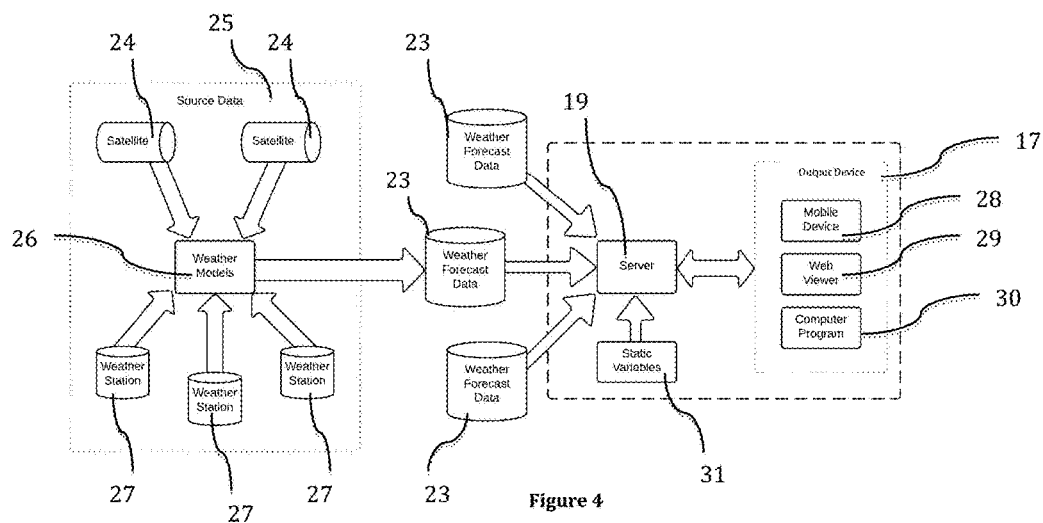
FIG. 4 is a block diagram of a representative configuration showing a central system relative to the user devices, server, and source data.

FIG. 4 is a block diagram of a representative configuration of a central server system 19 of the sunset prediction method relative to the output devices 17 and source weather forecast data 23. The weather forecast source data 25 is output as a weather model 26 which is generated by satellite data 24 and weather station data 27 that is run through a forecast model. The server then references one or more weather forecast data 23 sources and brings them into the server 19 to combine them with static variables 31 which may include topography or other features. The server 19 then feeds the forecast results to output devices 17 which may include mobile devices 28, web viewers 29, or computer programs 30.

Figure 5:
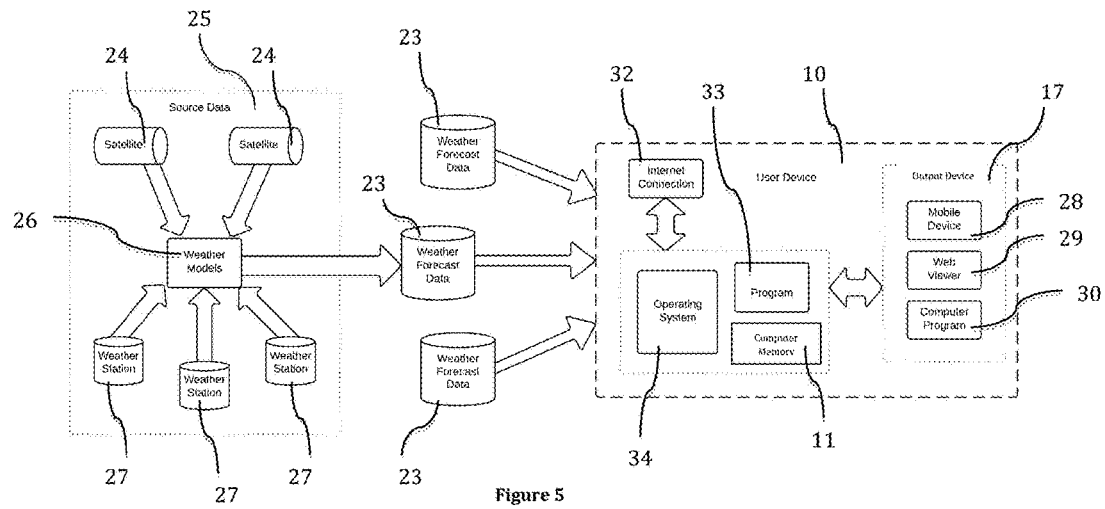
FIG. 5 is a is a block diagram of a representative configuration showing the user device on which the method of the invention can run and shows its relationship to the source data.

FIG. 5 is a is a block diagram of a representative configuration showing the user device 10 on which the method of the invention can run and shows its relationship to the source data 25. The weather forecast source data 25 is output as a weather model 26 which is generated by satellite data 24 and weather station data 27 that is run through a forecast model. The user device 10 then references one or more weather forecast data 23 via an internet connection 32 or other method. The user device 10 operating system 34, program 33, and computer memory 11 then work together to process and send the forecast to the output device 17. The user then views the forecast on a mobile device 28, web viewer 29, or via a computer program 30.

High Level Operation

The system provides a method to forecast natural light conditions, particularly around sunrise and sunset, by analyzing relationships between key variables in four dimensions; horizontal axis X and Y, vertical axis Z, and Time. The method for determining the forecast involves looking at the line of sight from the observer or desired location to any clouds and then to the sun as shown in FIG. 1. The sun provides the best color to the clouds when it is within a few degrees of the horizon relative to the clouds, depending on the cloud height this could place it below the horizon relative to the user and thus results in a non-intuitive situation for forecasting. The position of the sun can be determined by the following equations.

$$\text{Sunrise} = 12 - \frac{1}{15°}\cos^{-1}\left(\frac{-\sin\varphi\sin\delta}{\cos\varphi\cos\delta}\right) - \frac{TC}{60}$$

$$\text{Sunset} = 12 + \frac{1}{15°}\cos^{-1}\left(\frac{\sin\varphi\sin\delta}{\cos\varphi\cos\delta}\right) - \frac{TC}{60}$$

$$\text{Declination Angle}(\delta) = \sin^{-1}\left\{\sin\left(23.45° \sin\left[\frac{360}{365}(d-81)\right]\right)\right\}$$

Adding to the non intuitive nature of this forecasting the atmosphere adds effects which can influence the final forecast. The atmosphere acts as an imperfect lens and so scatters light when photons bounce off its molecules. The two types of scattering that cause sunset and sunrise colors are Rayleigh and Mie Scattering. By adding suspended particulate size to the analysis colors can be predicted as well as phenomenon such as crepuscular rays. The more dust particles of the right size, the more brilliant the sunset.

$$I = I_e\left(\frac{1+\cos^2\theta}{2R^2}\right)\left(\frac{2\pi}{\lambda}\right)^4\left(\frac{n^2-1}{n^2+2}\right)^2\left(\frac{d}{2}\right)^6$$

As the sun angle changes during sunrise (also valid for sunset), the colors in the sky and clouds shift as well. The following table gives the position of the sun's effects on the sky relative to sunrise (SR) in minutes beforehand. This is important for understanding when clouds at a particular altitude will light up and is based on the suns angle relative to the cloud and the forecast location.

SR−30: Deep Orange

SR−20: Twilight arch starts to glow (lasts 10-15 min) starting at 5-10 degrees and extending up to 40-60 degrees and is from high altitude (16 km) reflection on dust & ice.

SR−15: Crepuscular rays appear if long distance blockage present. Belt of Venus starts at 20 degrees (does not represent sun elevation as it accelerates as it lowers).

SR−5: altocumulus or stratocumulus clouds will be on fire.

Sunrise usually brings more saturated twilight colors than sunrise.

If the sunlight is blocked, potentially by clouds or terrain over the horizon from the observer, then the clouds do not light up as in FIG. 2. By knowing the position of the sun and clouds during the hour before and after sunrise or sunset, the amount of light and exact timing of light on the clouds may be predicted by constructing a three dimensional model of the atmosphere and surrounding terrain in order to apply light ray mapping and masking to determine if there will be cloud color. This allows the model to take into account multiple cloud heights and densities, haze, rain, complex weather situations, season, user location, terrain, local adjustments, and over the horizon factors which lead to accurate forecasts verified by statistical analysis. The method also takes into account and compensates for expected cloud drift as the source data cloud models are typically only accurate to +/−20 miles. The output may be embodied on a mobile device, a web interface, in print, or another application.

Distance from clouds at various altitudes can be calculated exactly using geometry equations either assuming a flat earth model for simplified solutions of a sphere model with atmospheric diffraction included for exact solutions. In general clouds of varying altitudes have the following distances to their relative horizons and to other clouds as shown in the table below.

|  | Low | Medium | High |
| --- | --- | --- | --- |
| Low | ~80-100 mi | ~140-200 mi | ~250 mi |
| Medium | ~140 mi | ~240 mi | ~300 mi |
| High | ~270 mi | ~300 mi | ~350 mi |

As shown in FIG. 4 one source for forecast data is the National Weather Service (NWS). The NWS regularly issues to the public a comprehensive package of weather-related information, including extended forecasts for various regions. Generally, the NWS makes weather information, including weather forecasts, available up to 364 hours in the future in 3-hour increments. As soon as the weather information is made available, the information is downloaded to a FTP server where it is made available to the public for various uses.

From the various weather forecasts, national maps portraying forecast changes may be generated, usually by meteorologists. A trained meteorologist may then analyze the forecast change maps to create conclusory opinions regarding future weather trends in various geographic locations. When multiple forecast sources are combined into one result, it is known as an ensemble forecast and typically improves accuracy. The system uses an ensemble forecast whenever possible and weights the source data depending on its accuracy regarding cloud forecasts.

Figure 7:
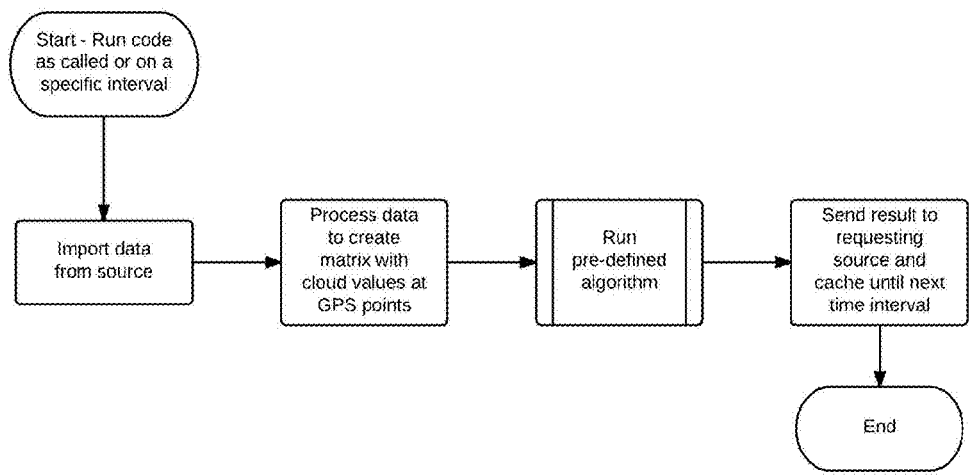
FIG. 7 is a flow diagram showing the major steps of the remote server operation.

One embodiment of method is shown in FIG. 4 where the data collection, processing, and output is performed on a server and then results are sent out to the users for display on the web, mobile device, or other platform. FIG. 7 shows server side operations which can be performed to automatically run the central system updates at a particular interval, for example when a NWS forecast update is released. After importing source data it runs the system and then sends the results to requesting users or to a web display.

Another embodiment is shown in FIG. 5 where the system is running as a program on a user device, such as computer or mobile device. In this instance, the central system could pull in source data via an internet or network connection.

Figure 6:
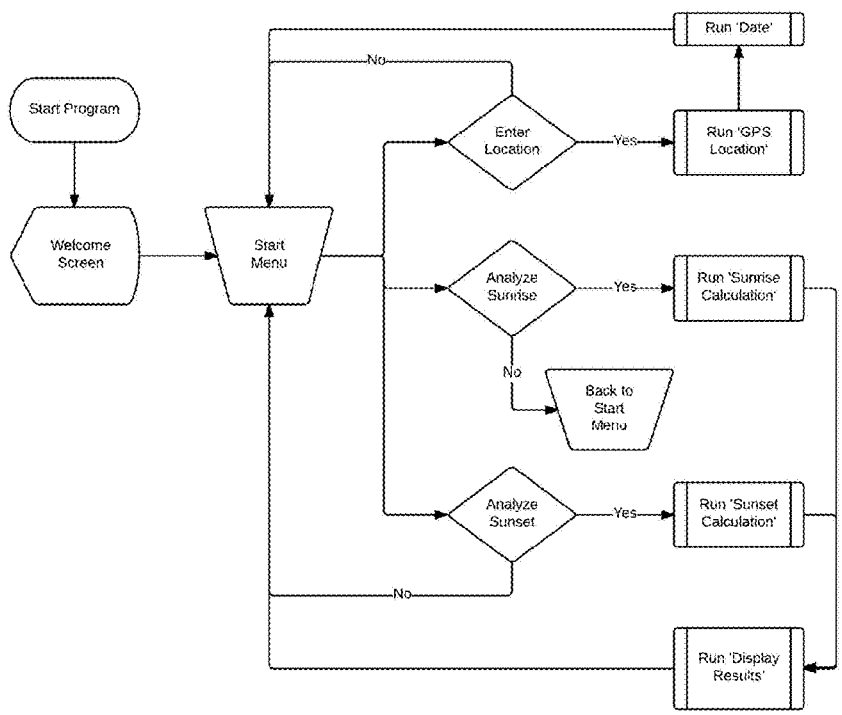
FIG. 6 is a flow diagram showing the major steps of one configuration of the user interface architecture.

FIG. 6 is a flow diagram showing the major steps of one configuration of the user interface architecture. In the embodiment of FIG. 6, the system is executed on a user device (such as shown in FIG. 3). As shown in FIG. 6, on program start, a welcome screen and menu greet the user and allow them to navigate through the program. It would allow users to enter specific locations or use a built in GPS device to provide a location, then sunrise or sunset forecast results can be run and displayed.

Determination of the Best Stage of Golden Hour/Sunset/Sunrise Light

Figure 37:
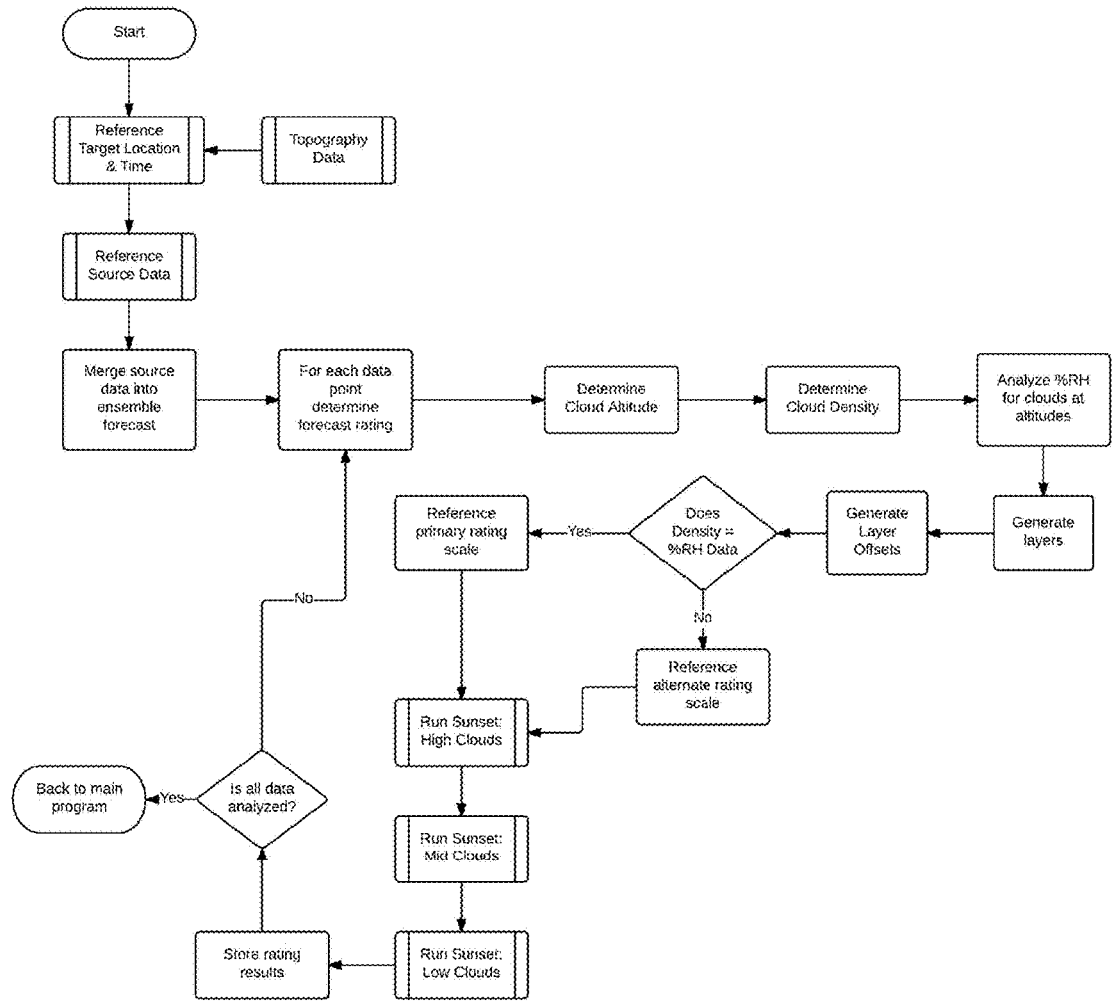
FIG. 37 is a flow diagram showing a method for determining rating based on cloud density, height, and METAR data.

Good light for photography can come in many forms. Excellent light around golden hour commonly presents itself in several scenarios, including: Pre-sunset/sunrise sun through thin to broken clouds or as Post-sunset burn and color. The first scenario can happen within an hour after sunrise or before sunset. The second scenario occurs up to 45 minutes pre-sunrise or post-sunset. Determining this timing can be critical in allowing photographers to plan their trips in terms of travel time, access, and equipment. For example the system tells the user that there will be nice or pleasing light 15 minutes before sunset or expect light for 5 minutes after sunset, then 10 minutes of no color, followed by 5 minutes of additional photogenic color. This is accomplished by using the horizon distance of all clouds present along via the three dimensional model that is constructed, such as shown in FIG. 37. The sun's position relative to any clouds and modifiers is analyzed to determine if photogenic light will be present in the forecast area.

$$\text{Horizon Distance (mi)} = 1.32\sqrt{\text{altitude(ft)}}$$

Forecast Display

Figure 8:
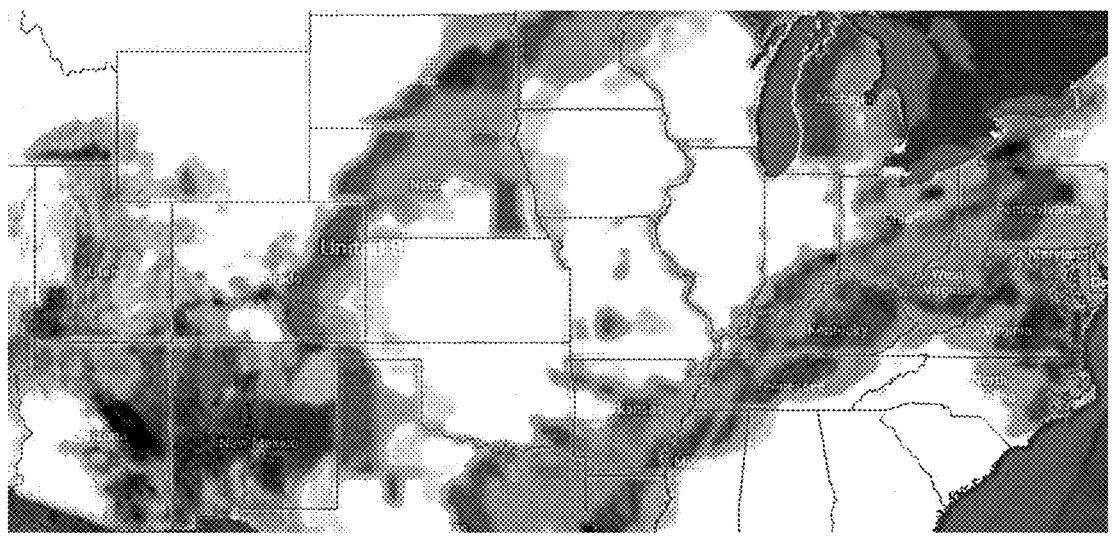
FIG. 8 is an image showing an output overlaid on top of a map in 2D.
Figure 9:
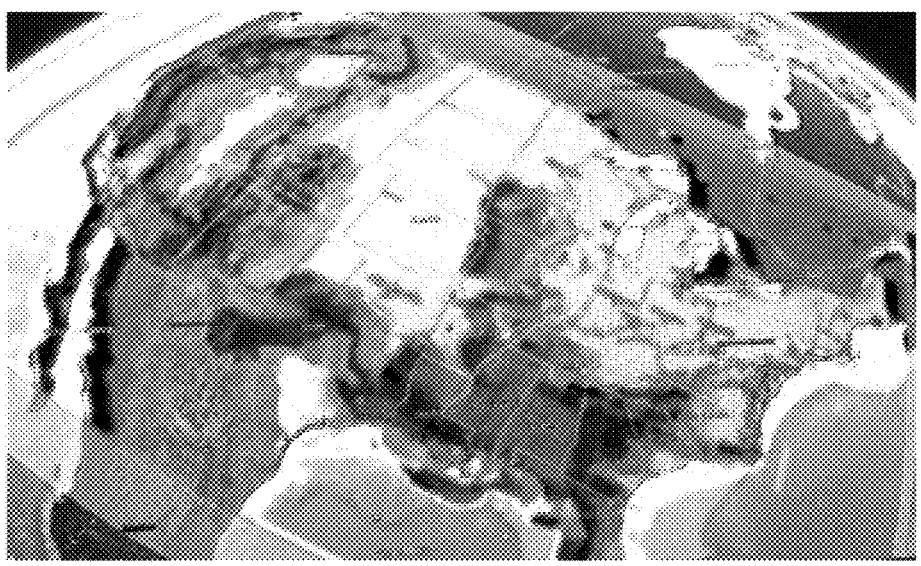
FIG. 9 is an image showing the output overlaid on top of a map in 3D.
Figure 10:
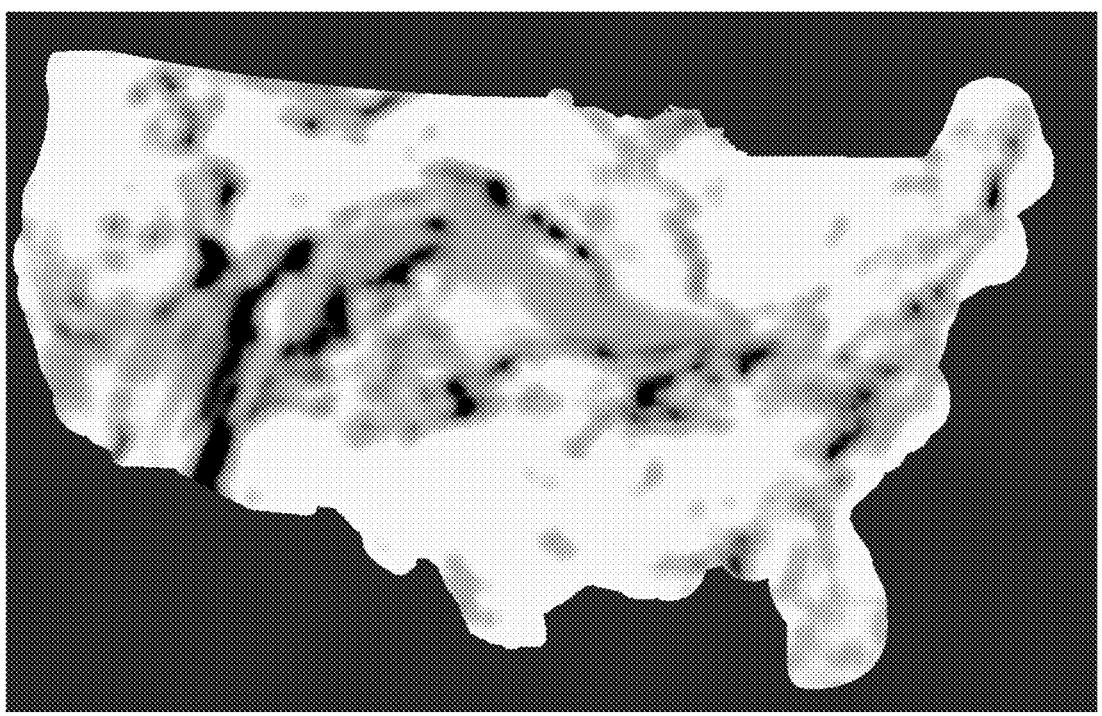
FIG. 10 is an image showing the output for just the continental United States.
Figure 39:
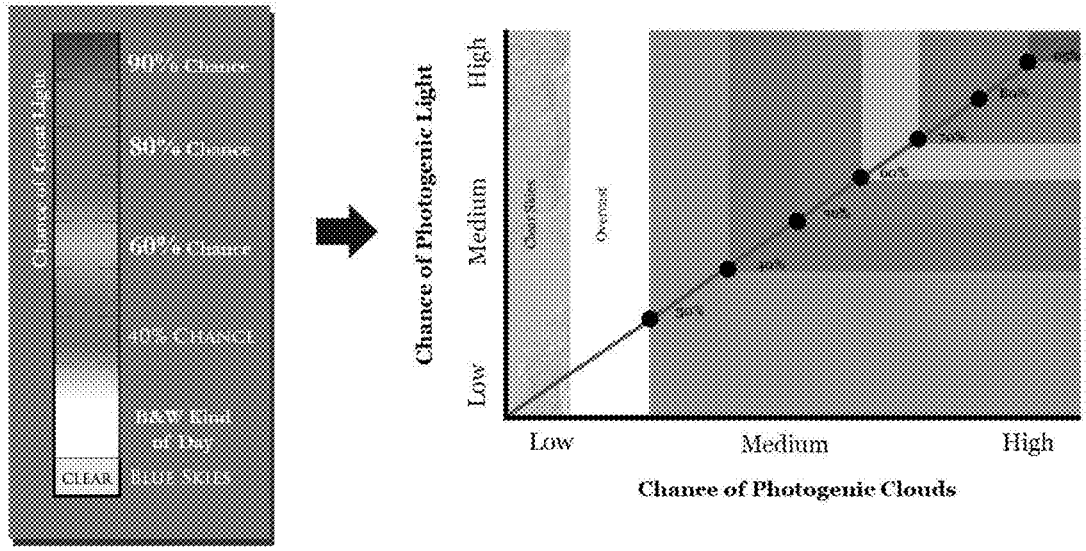
FIG. 39 is a graphical representation of how good light for photographers may be represented.

One method of display is shown in FIG. 8 as an overlay of the forecast ratings over an interactive map interface. This allows the user to zoom in or out as desired as well as overlay roads, state lines, park boundaries, directions, and other items onto the map. The rating may also be overlaid onto Google Earth style interface shown in FIG. 9, allowing the user to take topography into account and view as a globe. A static image for reference or archiving may be output as shown in FIG. 10, the output may be in one of several map formats. The sunrise or sunset rankings are displayed in this example as an isograph, shown in FIG. 39, with a rating scale from 1 to 5 or 0% to 100%, where 5 and 100% are the best conditions for photography and videography. This data may be displayed in other ways, such as a percent chance of success or color, without changing its intent or source as it utilizes the same system forecast data to generate the user interface. In one embodiment, the overlay uses red colors to indicate positive forecast ratings and blue colors indicate poor forecast ratings. The term "red colors" includes one or more various shades of the color red, which can be used to indicate different high rankings, or a single selected shade of red for all high rated locations. The term "blue colors" includes one or more various shades of the color blue, which can be used to indicate different low rankings, or a single selected shade of blue for all low rated locations.

User Alerts

Figure 11:
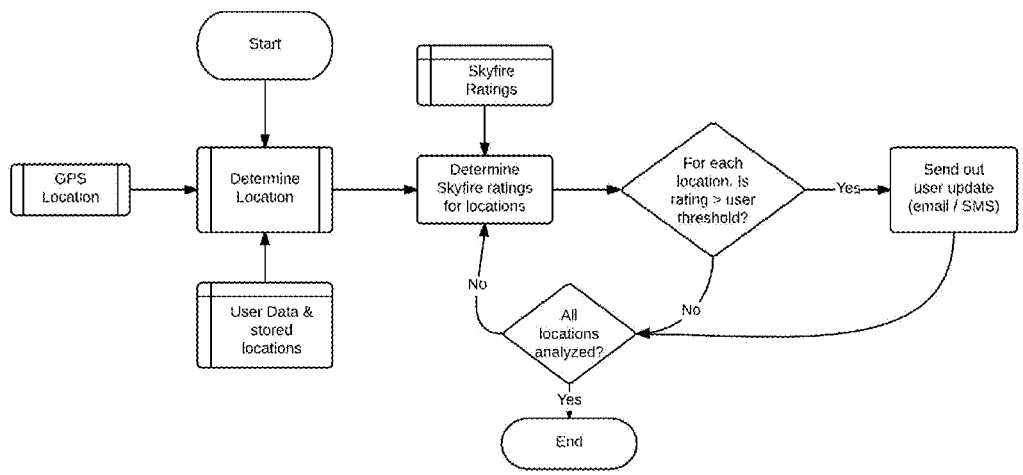
FIG. 11 is a flow diagram showing one embodiment of a method for alerting users to updates on their stored locations.
Figure 12:
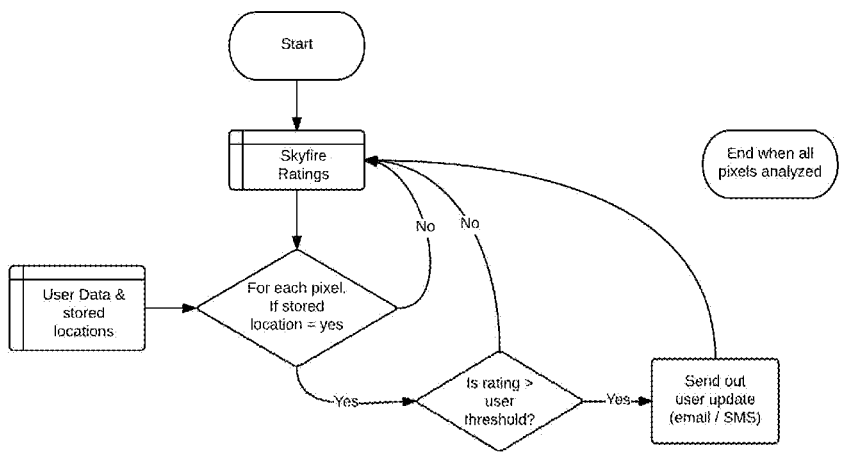
FIG. 12 is a flow diagram showing another embodiment of the method for alerting the user to updates on their stored locations.

One feature of the method shown in FIG. 11 will be to correlate user location or a saved list of locations to the output rating for a golden hour. If the projected rating is equal to or higher than a user selected threshold, or a default value, then an alert may be sent out to inform the user of the expected event. The alert may be sent out via email, short message service (SMS), or other similar method. This method is set up as a loop to run through all saved locations. Another embodiment of this method is shown in FIG. 12 where each data point is scanned against a list of stored locations, if the data point is stored and exceeds the threshold a SMS or email update will be sent to the user.

Use of Layers in the Analysis

Figure 13:
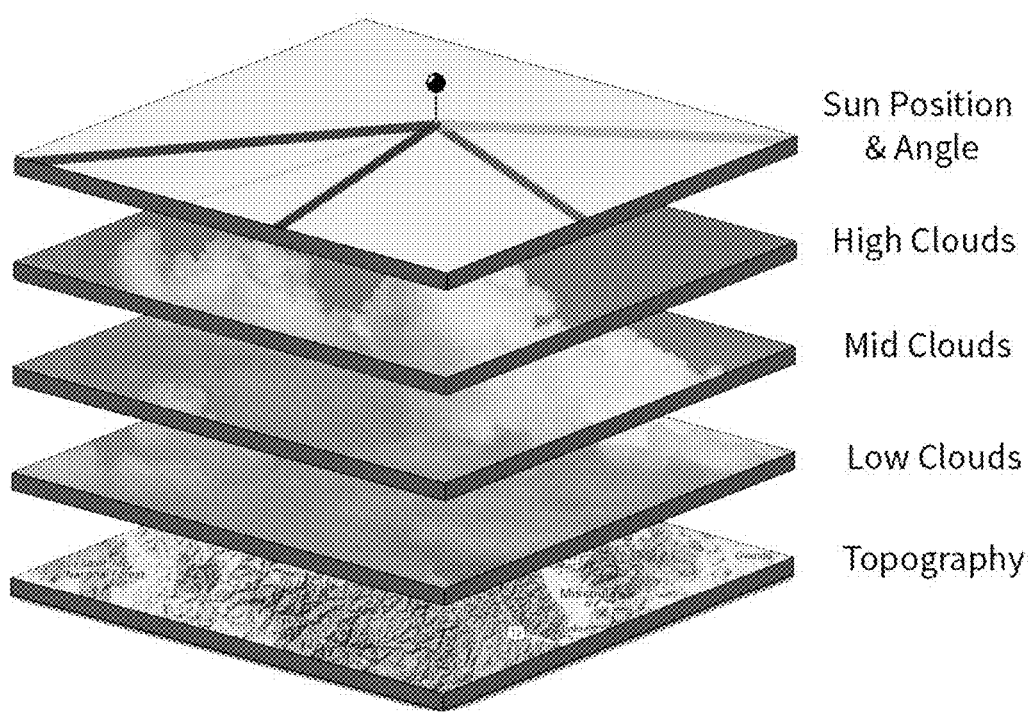
FIG. 13 is a diagram showing the major data layers used in the presently preferred embodiment of the method.

Layers are integral to the analysis of predictions using cloud height and density as base inputs. It is a geographic information system (GIS) methodology where each input is broken down into a dedicated layer so that its interactions with the other layers may be adjusted as needed, a representation of this is shown in FIG. 13.

Layer heights/priority may be organized depending on their levels of importance or quality, cloud height, or for a desired level of overlap. This ensures that the most important layers are analyzed last so their data is always represented in the end result, one method of this uses an overwriting matrix and a loop structure. For example, if there are topographic effects, they would be analyzed first as the cloud effects will be more important to the end result. If a matrix full of predicted values written in loop is used then the less important values can be overwritten as the analysis progresses. If a single equation method is used then the more important items will be weighted accordingly. The math, transforms, and equations used are standard matrix spatial transformations well known in the field of linear algebra.

Figure 14:
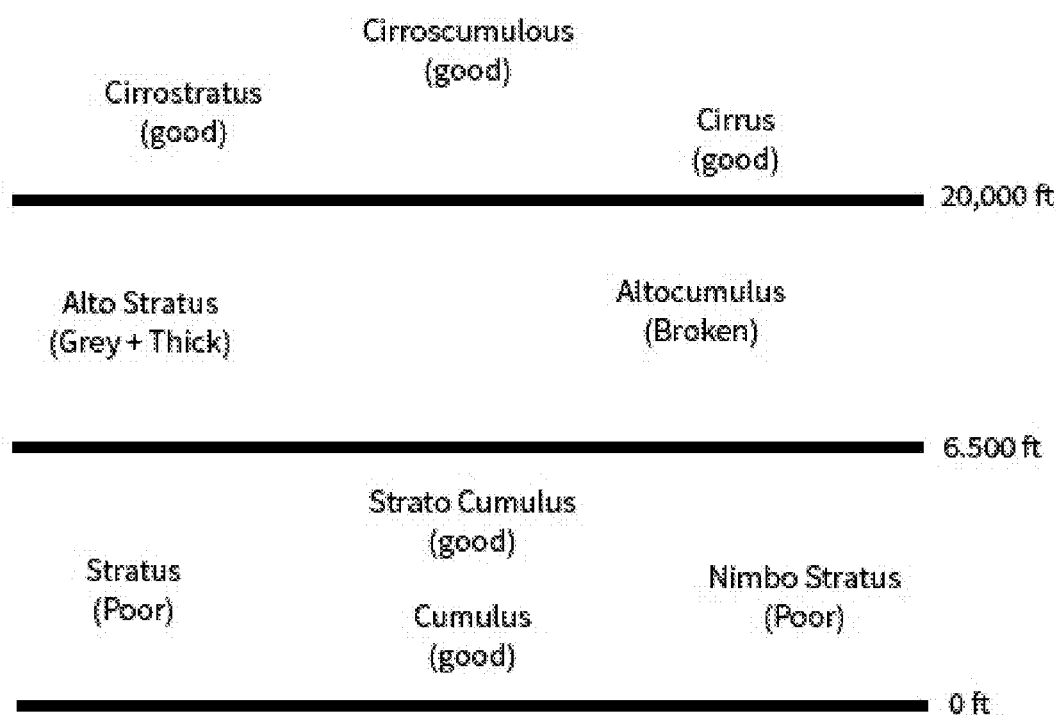
FIG. 14 is a diagram showing the major cloud layers and their typical altitudes.

In order to assist with determining cloud base heights, shown in FIG. 14, and breaking each level into its own layer there are a number of available and herein utilized options based on current meteorological techniques.

Figure 15:
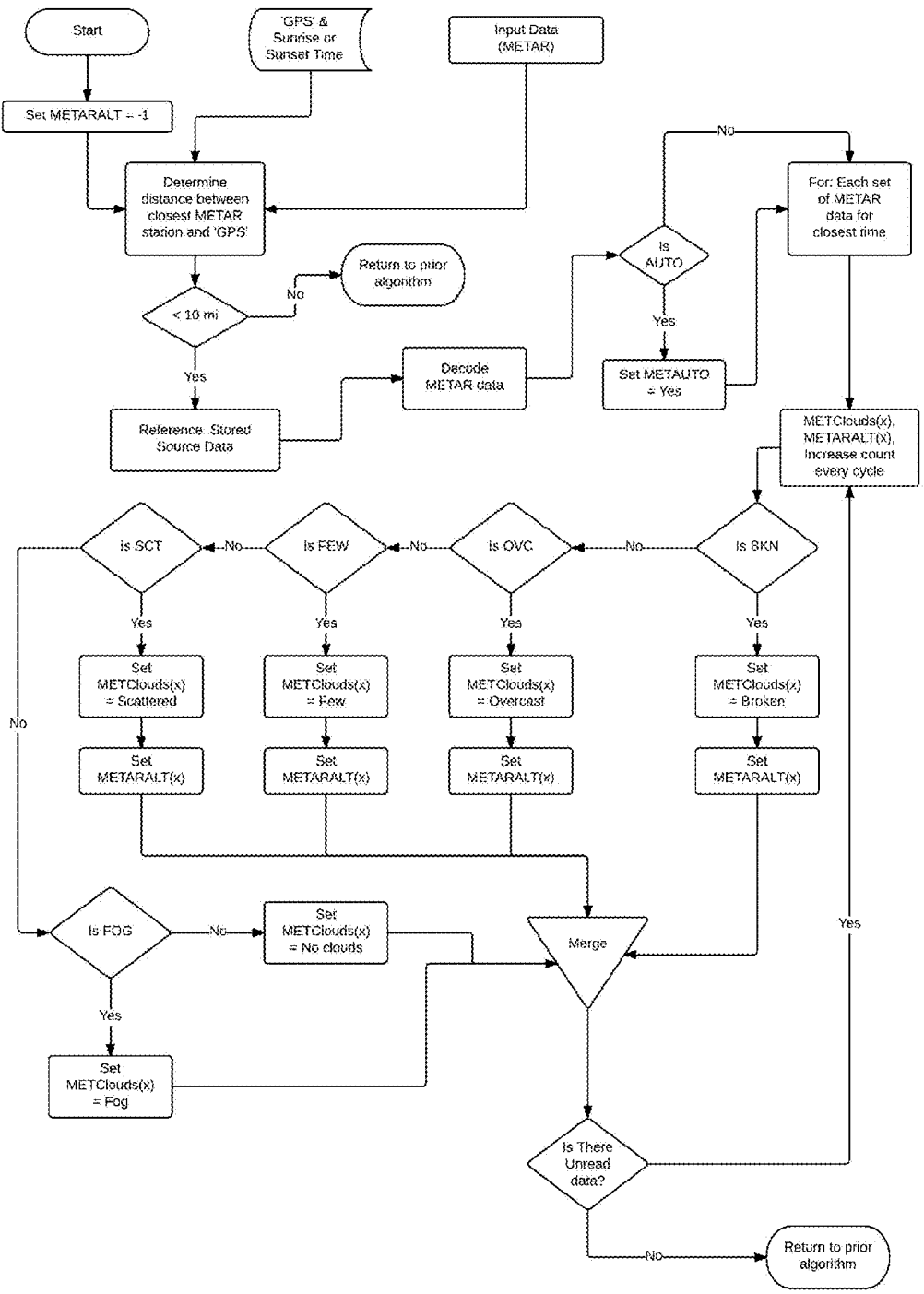
FIG. 15 is a flow diagram showing the major steps of an embodiment for determining cloud height using METAR data.

- The method can calculate the estimated height using Air Temperature, Dew Point, and Altitude.
- The method can determine localized ceiling heights using Meteorological Terminal Aviation Routine (METAR) weather data that are provided through weather stations across the country. Data is however unreliable over 12,000 feet without manual observation. A method for this is shown in FIG. 15.
- The method can retrieve this data from selected weather sites, such as National Oceanic and Atmospheric Administration (NOAA) satellite data.
- The method can calculate based off % Relative Humidity plots and soundings where chance of cloud formation at varying altitudes is displayed based on atmospheric pressure and water content.

The layers are used in the method to determine the masking of clouds via shifts and line of site calculations.

Zone Method for Determine Cloud Vibrancy

Figure 16:
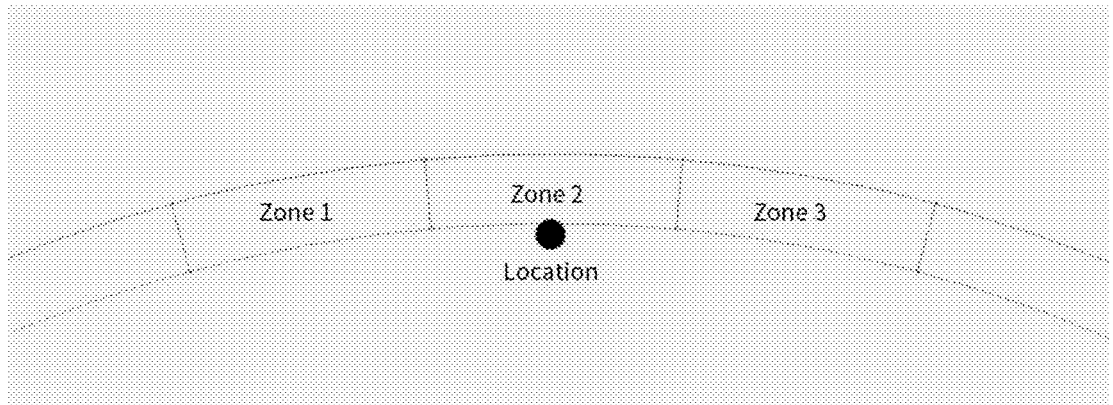
FIG. 16 is a diagram showing a method using zones and elevation of the sun relative to the horizon for preferential light in each zone.
Figure 18:
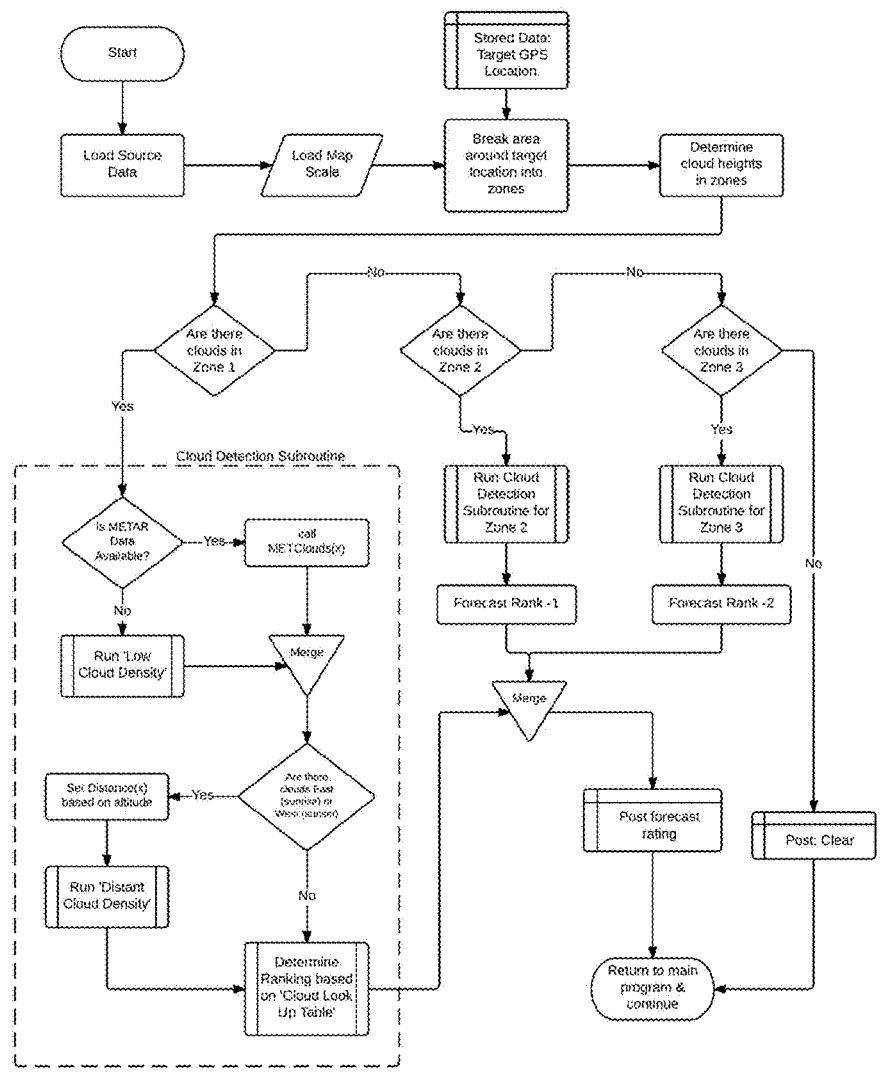
FIG. 18 is a flow diagram showing a method to determine light vibrancy using the zone method.

The zone method, one embodiment of which is shown in FIG. 16, breaks the sky into multiple vertical and horizontal zones as the sun instills different effects on each sector during sunrise or sunset. Zones are represented relative to the location of the user and split the sky into multiple sections; in this embodiment 3 one for sun facing, one overhead, and one non sun facing though it may be more or less, with a minimum of 1, depending on desired resolution. For example lighting up of clouds on the Western horizon during sunset is more common than lighting of the clouds on the Eastern horizon if there are clouds obstructing the view. This relationship can be mathematically determined based on the sun angle relative to the horizon and the location of the user, with the far Zone 1 clouds receiving light when the sun is −3 degrees relative to horizon, but the higher-altitude Zone 3 clouds receiving light for a longer period as they are lit until the sun is −9 degrees below the horizon relative to the location. One embodiment of this is shown in FIG. 18 where the cloud detection subroutine is run for each zone and rankings are applied to generate a forecast.

Figure 30:
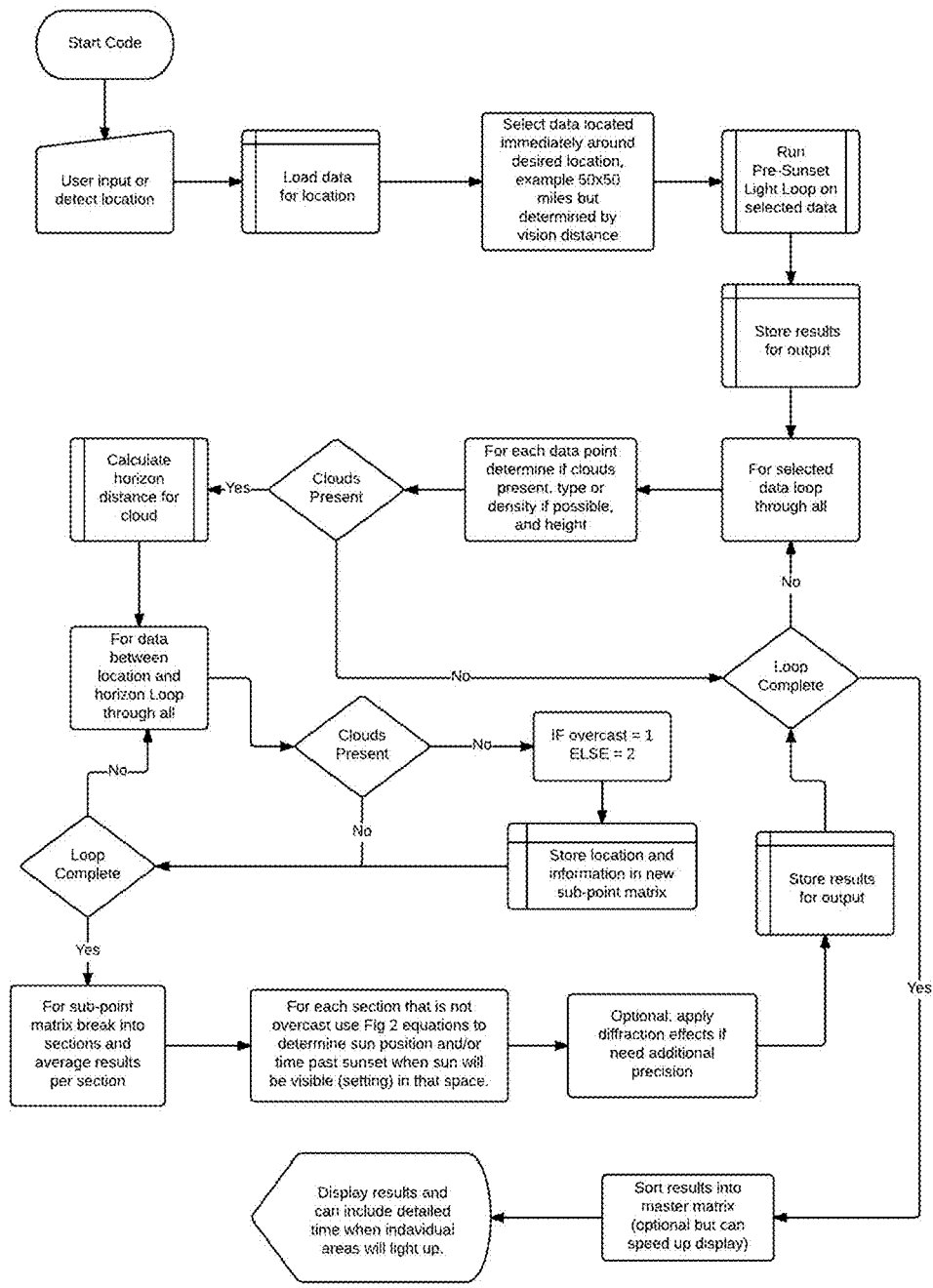
FIG. 30 is a flow diagram showing a method for determining detailed cloud illumination timing at sunrise or sunset.
Figure 31:
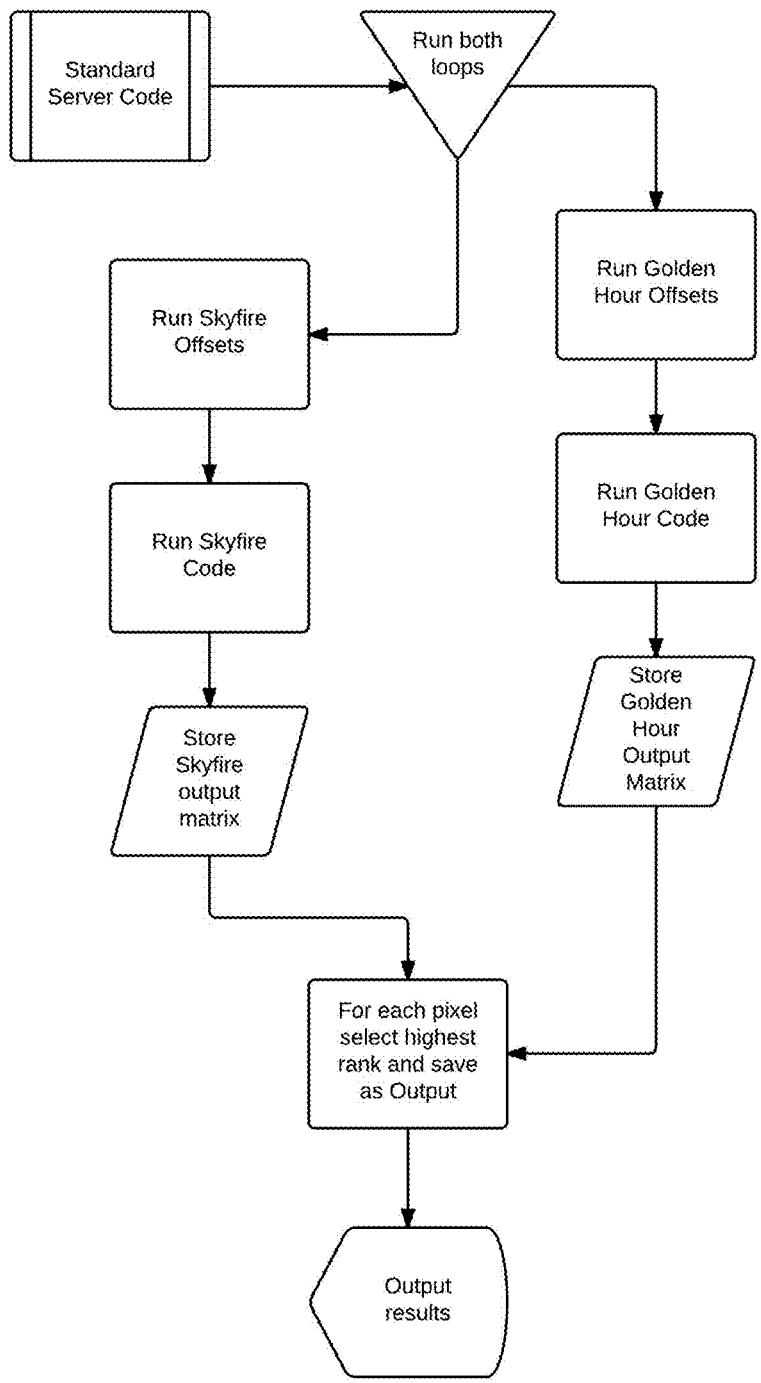
FIG. 31 is a flow diagram showing a method for combining analysis for multiple time points or multiple methods into a single output.

Another use of the sun position relative to the forecast location involves combining data from different sun positions (times) into a composite forecast. By using different inputs for direction of sunlight (i.e., sun position) different types of light may be looked at, from back lighting to reflected lighting. These multiple time points may be run separately and them combined into an easy to read composite forecast, as shown in FIG. 31. They may also be displayed separately allowing detailed breakdowns of exactly when and for how long lighting conditions will last. By altering the time length analyzed in each section you can change the resolution of the output. Another method for determining how long color during a sunset or sunrise will last is shown in FIG. 30.

The same cloud vibrancy method which allows for accurate prediction of cloud color after the sun has moved below the horizon also allows for the prediction of good light during the pre-sunset or post sunrise period. This light may take the form of dramatic shafts of light or crepuscular rays shining out from behind clouds or warm tone coloration in clouds that are backlit; such light is photographically pleasing and is representative of light preferred by photographers. The method can accommodate this type and information by moving the offset of the mask from the "below the horizon" to "above the horizon", where the horizon is relative to the viewer. The distance of clouds in that area can therefore then be determined and the same masking routines run for given locations and different points in time. The details of the forecast rating scale are modified accordingly to reflect the differing conditions of this period.

Generally in this method the greater percentage of the sky that is receiving color during "golden hour," that period of time shortly after sunrise or before sunset representing warmer tones and softer lighting that is preferred by photographers, correlates to a higher rating for that location at either sunrise or sunset. It also enables very precise predictions, down to events lasting several minutes, where obstruction caused by clouds at varying altitudes and distances can be taken into account. One possible variant of the method uses the NESDIS (National Environmental Satellite, Data, and Information Service) data set with METAR data but this same functionality can be utilized no matter what the source data is as long as it provides cloud locations and altitudes. An example of an alternate implementation would use relative humidity plots at various pressures (altitudes) to determine the same cloud data.

The area around the target is broken into sections and a radius of 10 miles is chosen as an initial value. This may be adjusted based on user location, for example in the flat land of Kansas the viewing distance will be much further than the hilly areas of North Carolina or Virginia. The example algorithm also has a "down-rank", or reduction in rating, for certain zones, this is due to the fact that the zone opposite the sunset (zone 3 or zone West) has a lower probability of being lit by dramatic light as the chance of obstruction is greater. This down-rank is optional and may be removed without impacting the overall functionality and intent of the algorithm.

Figure 17:
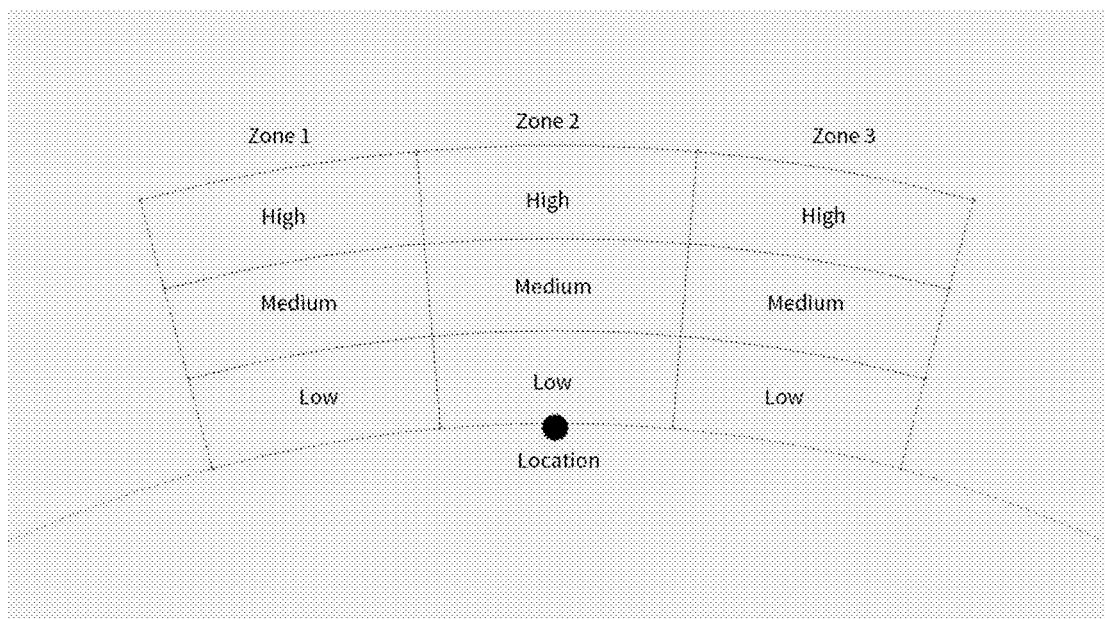
FIG. 17 is a diagram showing a method using zones in both the horizontal and vertical dimensions and the elevation of the sun relative to the horizon for preferential light in each zone.

The zones may also be extended vertically as shown in FIG. 17 to provide additional detailed analysis and offsets for different cloud heights; low, medium, and high as pictured in this instance.

Figure 19:
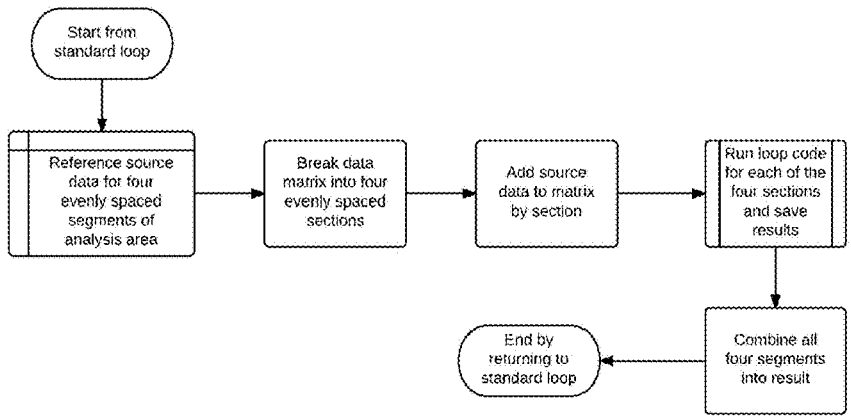
FIG. 19 is a flow diagram showing a method of analyzing an area by quadrants.

Zones can apply to analyzing the entire selected country, such as the United States, by using time zones to allow the code to analyze nearer to sunset in every location as shown in FIG. 19. So the resulting a multi-level nested zone effect with country-wide zones that are then broken up into individual location zones. After running the analysis in each zone, the final result is recombined to create one seamless forecast for display to the user. The preferred method of joining the separate forecasts from multiple time zones involves a feathered blend to prevent any sharp changes in rating. This also enables a compensation for the sunset or sunrise times as they vary across the time zone. By structuring the blend it provides a weighting effect to the forecast to more accurately show results for a particular location, particularly when the source data is rounded to the nearest hour and is thus of a stepped nature.

Model Method

Figure 22:
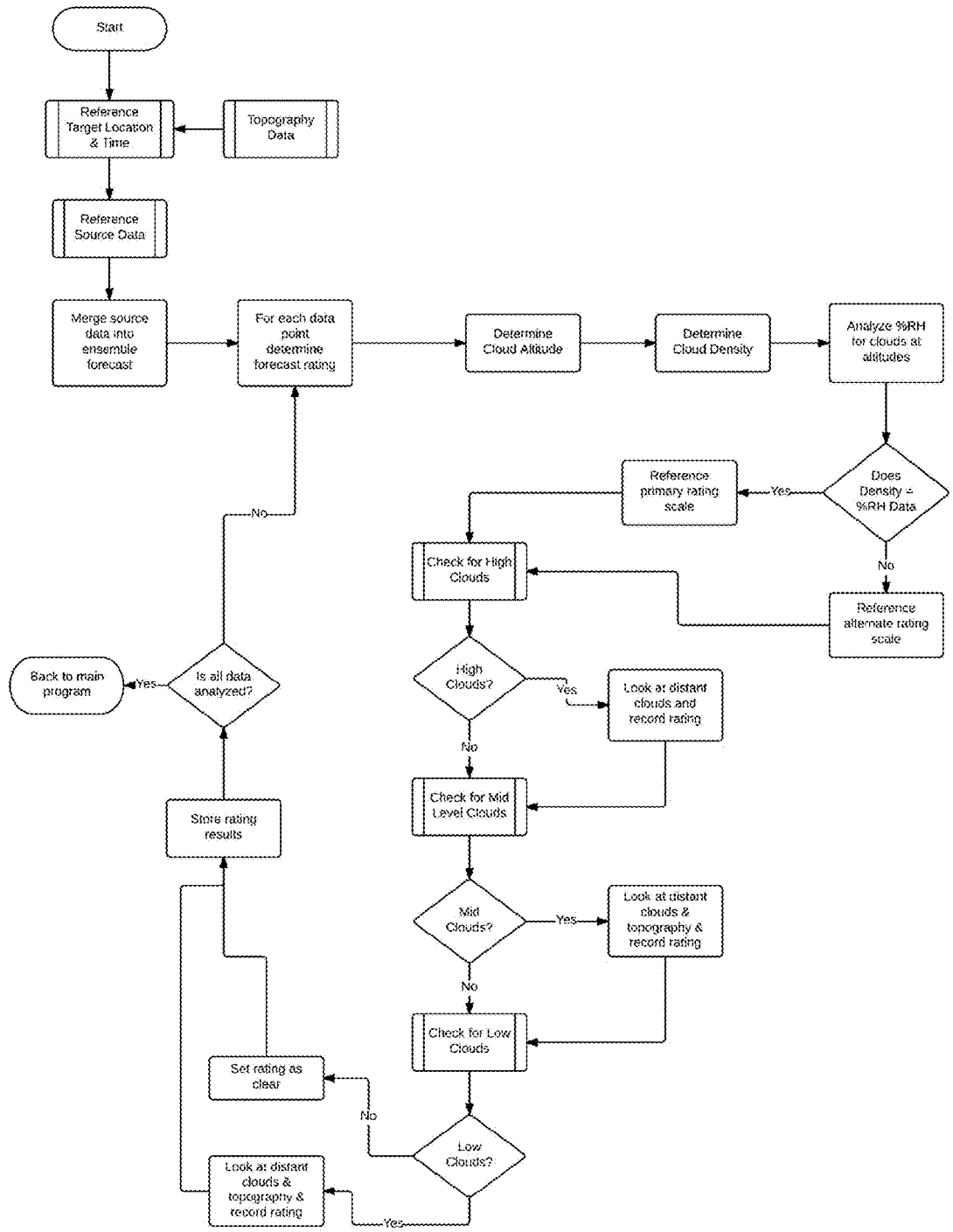
FIG. 22 is a preferred method for developing a forecast.
Figure 27:
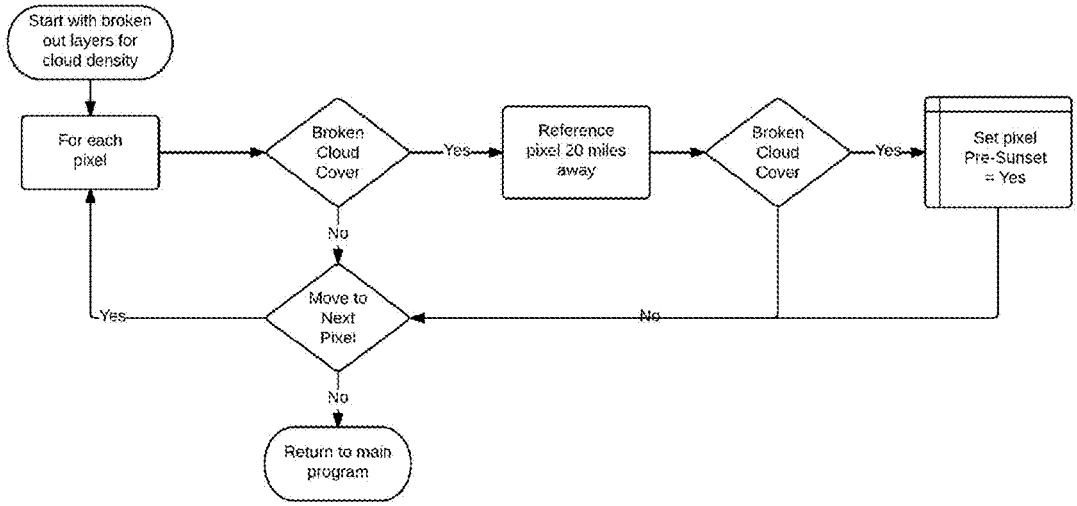
FIG. 27 is a flow diagram showing one embodiment of a method to determine a pre sunset light rating.
Figure 28:
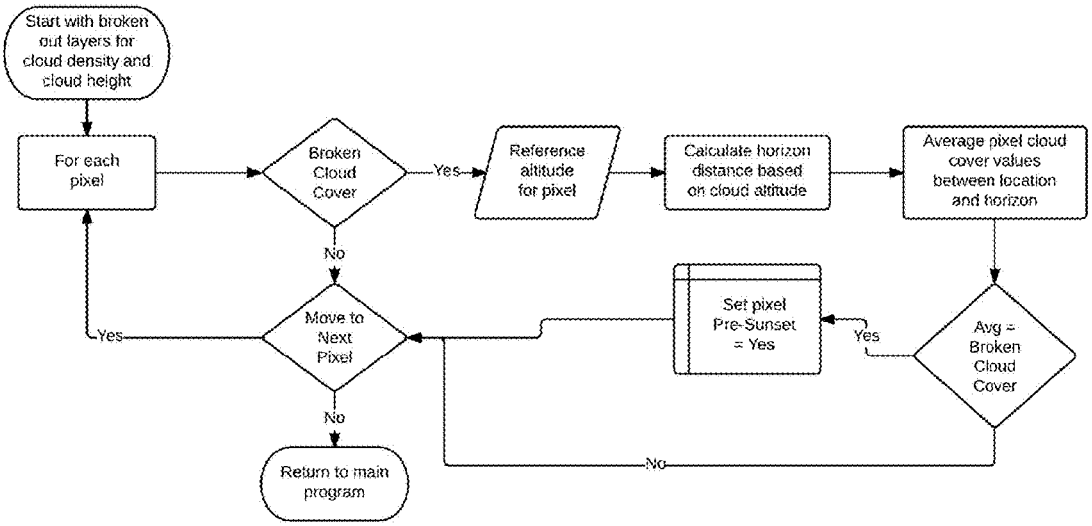
FIG. 28 is a flow diagram showing one embodiment of a method to determine a pre sunset light rating.
Figure 29:
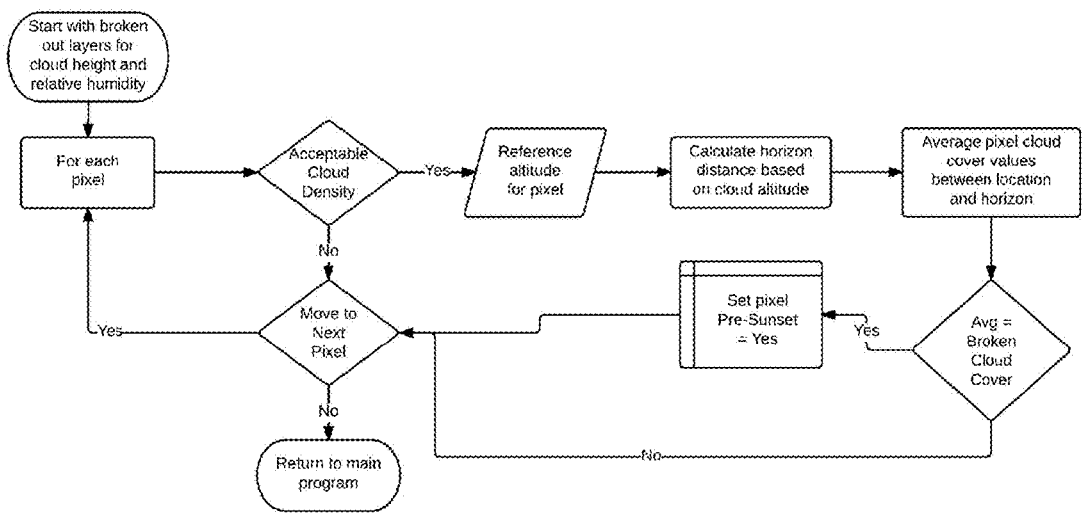
FIG. 29 is a flow diagram showing a preferred embodiment of a method to determine a pre sunset light rating.
Figure 40:
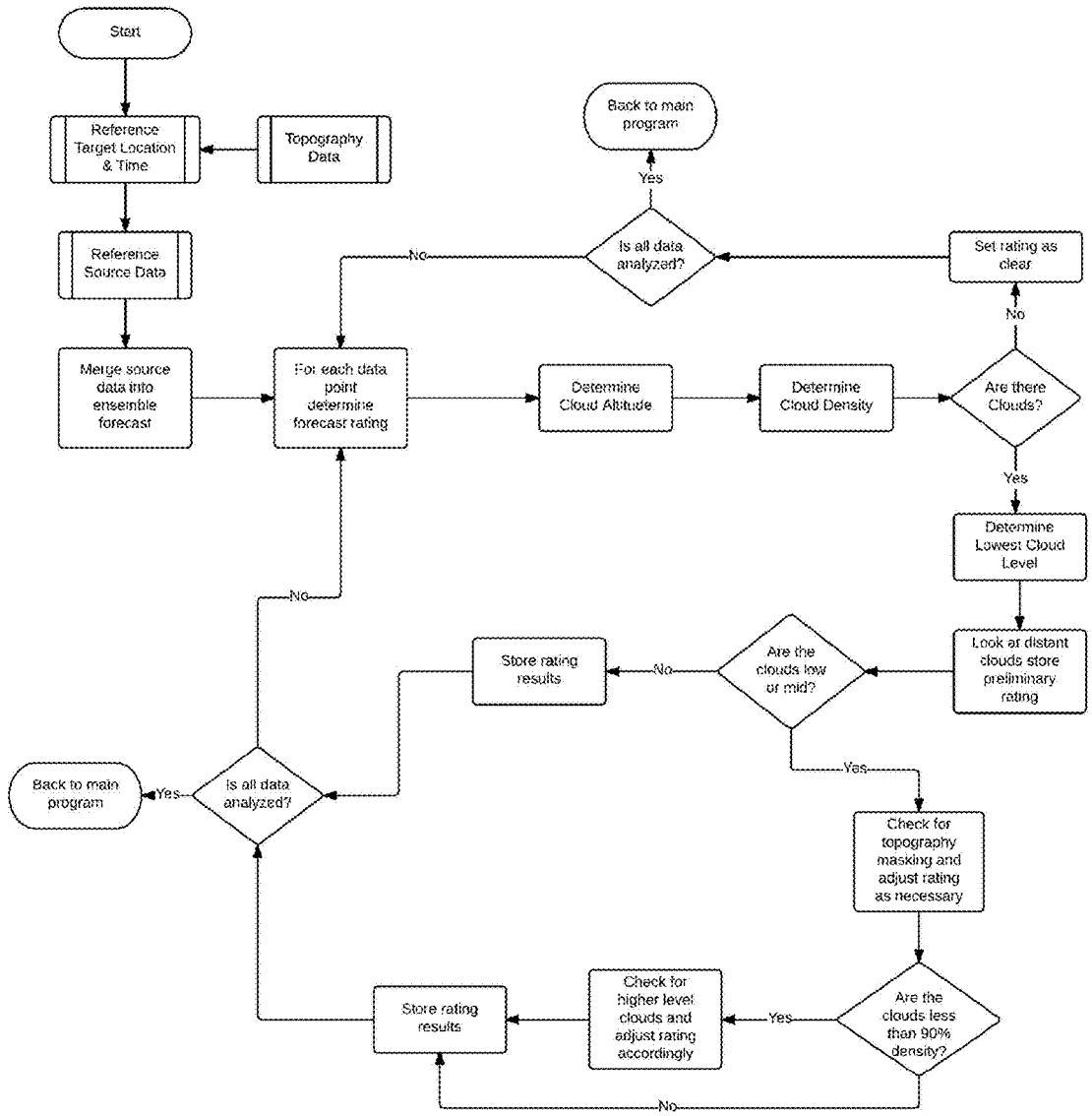
FIG. 40 is a method of developing a forecast by selecting the lowest cloud layer.

To determine the interaction of key variables at multiple altitudes a 3D model of the system can be constructed for every analysis point which allows the method to more easily be applied in software. One preferred embodiment of this method is shown in FIG. 37 where the data is imported and merged into an ensemble forecast and then run through a loop for each data point where its cross checked between cloud indicators and then a forecast developed by looking at layers and offsets. Another is shown in FIG. 40 where every data point that needs analysis is run through a loop where the lowest level clouds are determined and analyzed with special provisions for terrain interaction or the ability to see high cloud layers through thin low ones. Another preferred method is shown in FIG. 22 where every data is point which needs analysis is run through a loop structure from highest clouds to lowest clouds so that the low clouds take precedence in the rating. A version of this method simplified down to its most basic nature is shown in FIG. 27 where the loop checks for clouds over the forecast location and in the distance to develop a rating. A more involved method for increased accuracy is shown in FIG. 28 where the offset distances are based on cloud height and horizon distance. A version similar to FIG. 28 is shown in FIG. 29 where the general broken cloud cover is replaced with an acceptable cloud cover check which increases accuracy by allowing more precise determination of what is acceptable based on the type of light the forecast is checking for.

Figure 26:
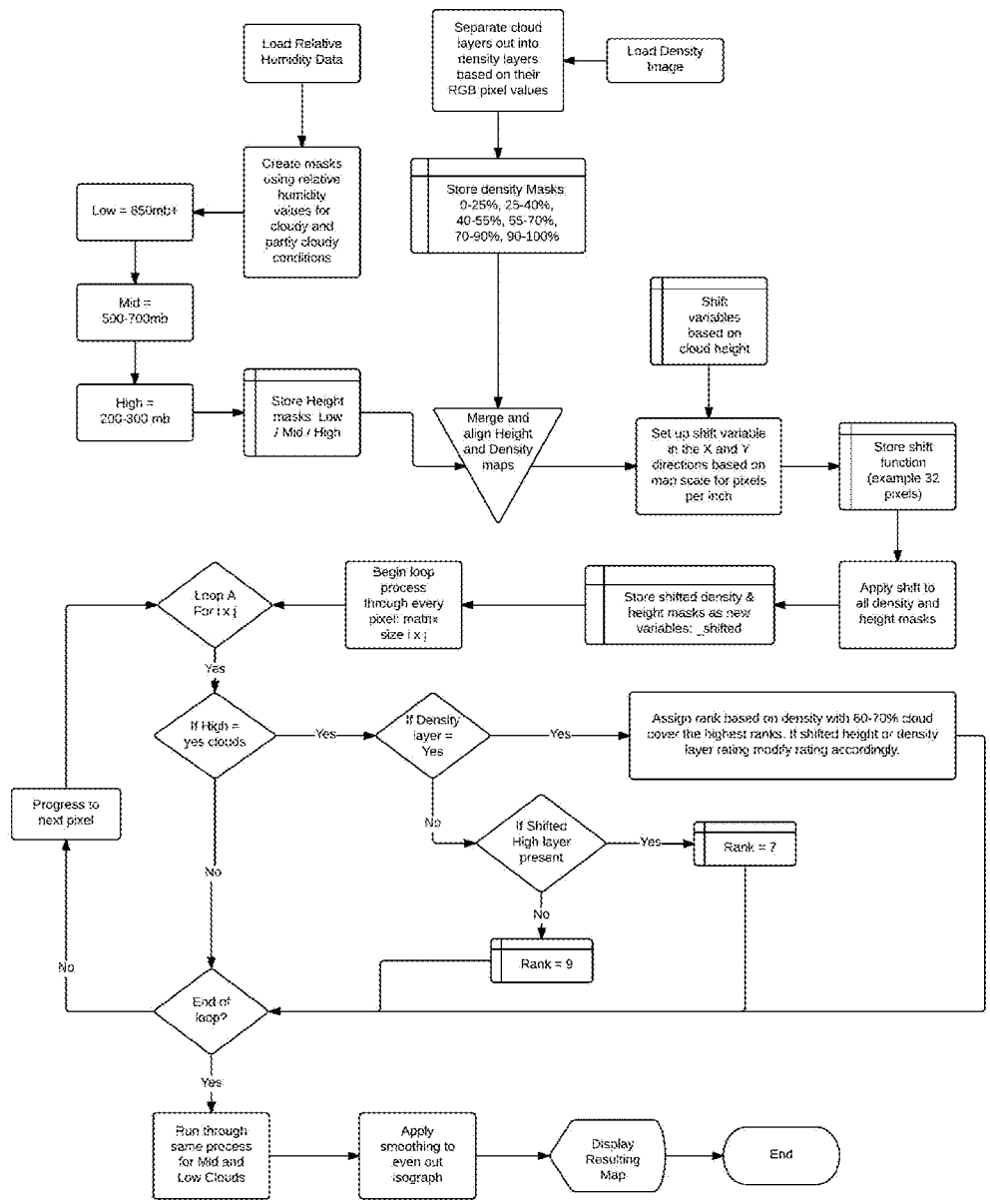
FIG. 26 is a is a flow diagram showing one embodiment of a method to use relative humidity and cloud density to determine if clouds are present and assign a rating.

Another method is shown in FIG. 26 where it goes over an example using high clouds in detail by creating layer masks from relative humidity data and merging them with density data. This merging can require adjustments if scales and map projections are different between data sets. It then shows how shifts are calculated based on cloud height and image resolution and the loop process using matrix values i and j to represent the forecast location. The ratings take into account far clouds through the shifting mechanism, with shift distance varying by cloud height, and after the loop is complete apply smoothing and display the result.

Use of Relative Humidity, Pollution, Particulates, and Other Methods

Relative Humidity

Clouds are based on condensed moisture in the atmosphere and so percent relative humidity (% RH) plots can be used to determine how likely it will be for clouds to form at various altitudes. When the % RH reaches the dew point for that temperature and pressure clouds will form, and a set of rules is used to assist in forecasting based on typical atmospheric conditions. Relative humidity plots can be for multiple altitudes in isograph form for an area, where altitude is represented by millibars of pressure (mb) with lower altitudes being higher values, or for one location in cross section form.

Typical % RH values for partly cloudy conditions leading to good light for photography.

High Level Clouds (300-200 mb): 50-70% relative humidity

Mid-Level Clouds (500-700 mb): 60-80% relative humidity

Low Level Clouds (925-800 mb): 80-90% relative humidity

Values above 90% relative humidity are considered fully overcast and values between the optimal values and fully overcast are rated with mid-range values. As source relative humidity data is analyzed it is segmented out into layers and used to generate the forecast using the method shown in this document.

Pollution and Particulates

Pollution and particulates in the atmosphere can have a large impact on sunset vibrancy. For example smoke from a fire can cause dark red skies at sunset. Red skies also develop in the South East United States when the trade winds blow sand and dust across the Atlantic Ocean from the Sahara Desert which can greatly enhance sky color. Particulate in the form of volcanic ash, such as during the 1980 Mount St. Helens eruption in Washington State, also acts as a color enhancer to sky color. Even pollution measured as particulate can cause unusually colored sunrise or sunset events or unusually dull events depending on the pollution composition and density, such as in the Los Angeles basin, and over industrial centers such as South Chicago in Illinois and Gary Ind. The effect of particulates can be added to the analysis using the Rayleigh and Mie Scattering equations.

Analysis Times

Target photographic times may be chosen for analysis based on factors such as sunrise and sunset time or periods within that range for locations where a forecast is needed (e.g., the period of time when the sun is 1 to 6 degrees above the cloud horizon, or other suitable measurement periods determined by one skilled in the art). Weather forecasts rarely allow up to the minute predictions, though the short term (hours to several days) forecasts may be augmented by real time (typically 15 minute image time to server upload delay) satellite images to act as a check mechanism. The method for aligning a real time image with a forecast involves retrieving the forecast and satellite data for the area of interest and then aligning them taking into account map transforms and any image distortion present from the satellite camera lens. Once aligned projected cloud density and/or elevation can be compared for each data node (for example HRRR uses 12 km resolution data points) using a loop structure. To provide a comparison the image must be parsed to extract the cloud/weather information. Several methods for this are discussed in other sections and include but are not limited to color analysis, temperature analysis, and reflectivity. An additional step may be required if snow is present as it can result in the same temperature/reflectivity signature as clouds in certain cases.

Forecasts from the major weather services are run on supercomputers, typically over 1 or 3 hour blocks of time with multiple updates per day. Initial conditions taken from weather stations around the world are used to seed the models and provide a baseline for the analysis. Therefore, time frames of several hours up to a day in advance has so far been acceptable to use in predicting light condition ranges for golden hour as an analysis point. To help account for un-forecasted cloud movement and provide an easier to interpret output map a smoothing algorithm is used to help average out the results. The smoothing algorithm uses a Gaussian blur method which is known to experts in the field of photography.

Image Analytics

Use of image analytical tools, such as invert and double to get more usable information out of the images in code is utilized to provide faster running programs. These tools all use well-established matrix algebra functions and in themselves do not represent new technology, however the way in which they are used in the APP together with weather data results in a novel method to predict sunset vibrancy.

In order to account for the uncertainties common in weather forecasting the results of the predictions can be smoothed or blurred. The smoothing algorithm is used to remove small code artifacts and allow smoothing of localized hot spots. This method also accounts for any discrepancies in cloud movement versus the prediction. This uses a Gaussian blur function, and operates on the data to average the pixels in a specified or set range around the target pixel, and then assigns that pixel a new value based on that average. It then steps through the entire image pixel by pixel to help smooth the data, thereby making it easier to read in the APP map output.

Masking, or creating a map-viewable interpretation of conditions with certain qualifications in the data, may be based on binary, luminosity, RGB (red green blue), or other industry standard methods. Masks may be created through preset functions, graphical programs, custom loops, or matrices with selected threshold levels. The threshold levels which determine the coverage area of the mask can be modified as needed per the mask function, as each data source can require adjustments in the numbers to ensure accurate output. As an example NOAA maps (www.noaa.gov) typically uses grey scale clouds while Twister Data (www.twisterdata.com) uses green scales which have different RGB threshold levels to get the same data while a mask developed in the program architecture is a matrix of numbers. NOAA source data is typically stored in a grib or grib2 file format designed to efficiently compress weather data, which when expanded takes the form of a numerical matrix. Alternative formats could include METAR format, or a graphical format, or alternative format known to those skilled in the art. Some key threshold values include but are not limited to different cloud densities, different cloud heights, haze, particulates, relative humidity, and CAPE.

Use of Topography Overlays to Account for Geographical Features

Mountains and other geographical features can impact sunset visibility from a given user's location. The current system also functions to check for obstructing terrain, by referencing the location with surrounding topographical information (which may be accessed from suitable databases of topographical information). The relative altitude of the location with regards to terrain between the location and the sun may be used to determine if sunlight may be blocked. For example, if there are low clouds in the Rocky Mountains and the user is located in a valley, then the user's view will exhibit no color in the sky even if there is a break in the clouds an optimal distance away. If a given location experiences low clouds, but there exists a break an optimal distance away in Iowa or a similar flat region, then the user will very likely experience increased sunset vibrancy under those conditions.

Figure 20:
FIG. 20 is an image showing high elevation topography in the continental United States.
Figure 21:
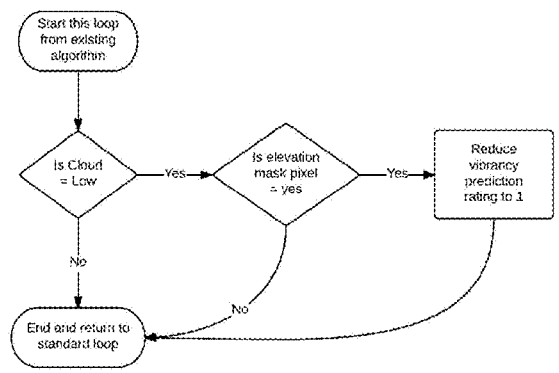
FIG. 21 is a flow diagram showing a method to integrate topography data into the method.

To account for this a layer mask is added representing topography as shown in FIG. 20. The map display in the APP will show a masked area for low clouds and fog, and inform the user of a potential low-rating sunset. It is important to note that the area of masking shifts depending on sun position (sunrise, sunset, and seasonal) and the layer dynamically compensates. This process of using a masking technique can be applied as an adjustment after the standard algorithm has run or be integrated into the loop process as shown in FIG. 21. The method can check based on cloud position and reduce the forecast based on the local topography, or the method can check every location where topography could block clouds and adjust accordingly.

Assigning Ratings

Figure 23:
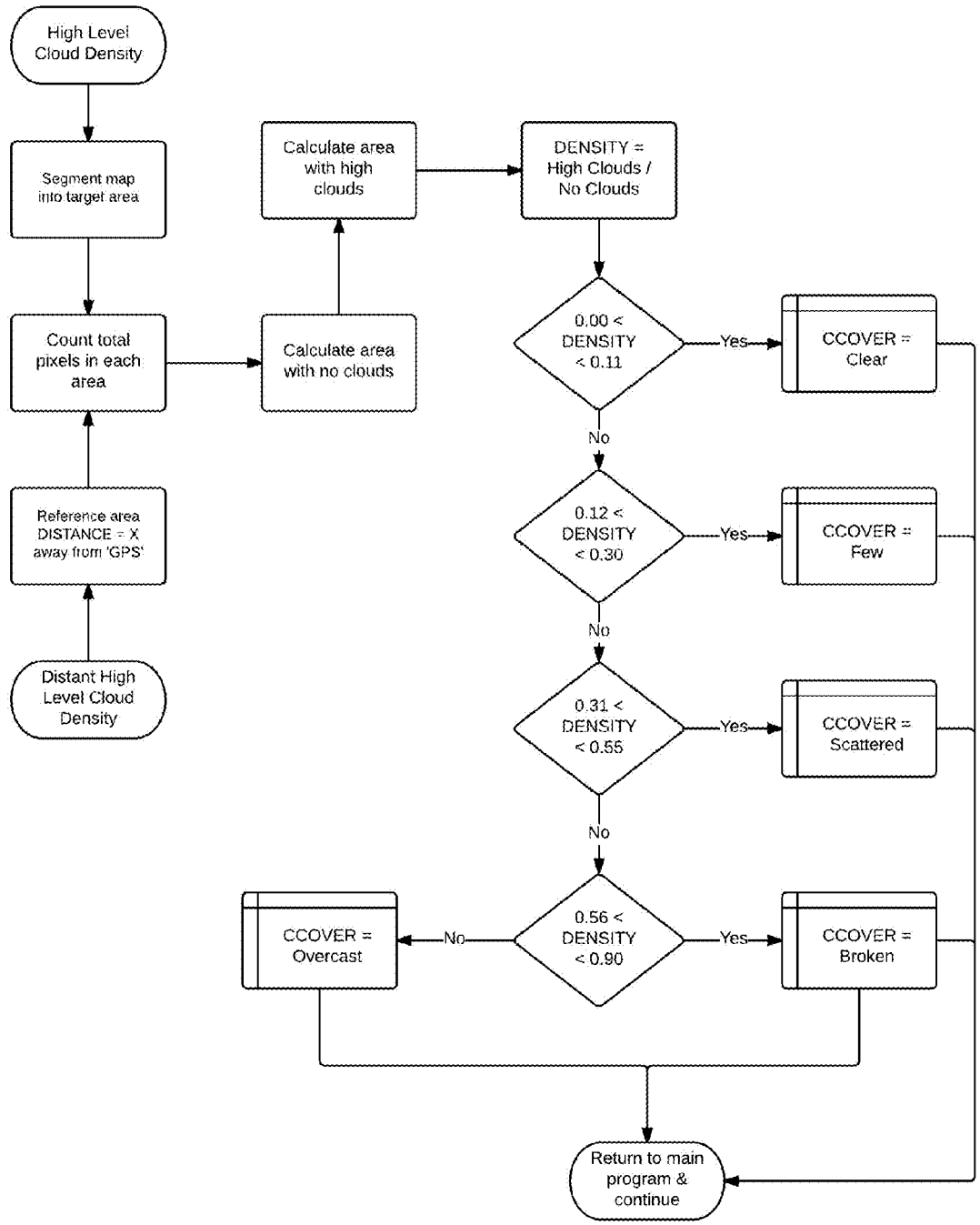
FIG. 23 is a flow diagram showing a method for assigning cloud ratings based on cloud density.

Ratings can be assigned based on a standard meteorological breakdown of clouds by the following categories: Clear, Few, Scattered, Broken, Overcast, or Fog. One method of assigning cloud density values to the corresponding meteorological terminology is shown in FIG. 23. The data can also be broken down by percent (%) cloud density or other such variables obvious to practitioners in the art of meteorology, such as cloud height and type. Ratings can also be assigned by an intermixing of these variables depending on each algorithms data set. The rating values are then correlated with the sky's photogenic appearance, with preferred (higher) ratings equaling better light for photography. An example method for determining standard meteorological cloud breakdown is shown in the table below.

| Target Location Clouds | Offset Location Clouds | Lighting Conditions |
| --- | --- | --- |
| Clear | Clear | No Clouds |
| Clear | All Else | Very Low Contrast |
| Few | Clear | Some Color |
| Few | Few & Scattered | Some Color |
| Few | Broken | Few Colors |
| Few | Overcast | Low Contrast |
| Scattered | Clear | Vibrant Colors |
| Scattered | Few | Vibrant Colors |
| Scattered | Scattered | Some Color |
| Scattered | Broken | Few Colors |
| Scattered | Overcast | Low Contrast |
| Broken | Clear | Vibrant Colors |
| Broken | Few | Vibrant Colors |
| Broken | Scattered | Some Color |
| Broken | Broken | Few Colors |
| Broken | Overcast | Very Low Contrast |
| Overcast | Clear | Vibrant Colors |
| Overcast | Few & Scattered | Some Color |
| Overcast | Broken | Few Colors |
| Overcast | Overcast | Very Low Contrast |

An example rating set based on values from 1-10 can be used where the viewer location and distant clouds result in a rating. This method can also use examples based on a rating scale of 1-5 or 0% to 100%, with 5 and 100% being an excellent chance of viewing a pleasing sunset or any other manner of color coded or numerical scale which makes obvious to the user the forecast results.

Using Relative Humidity Data

Figure 24:
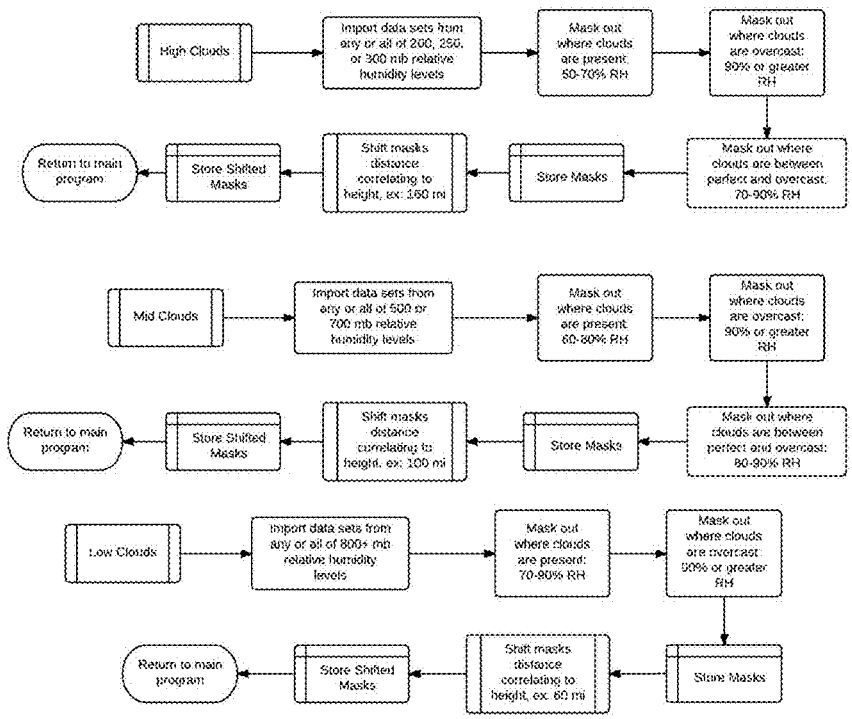
FIG. 24 is a flow diagram showing a method for separating out clouds at varying altitudes based on relative humidity.

While some cloud cover and density forecasts, such as the National Weather Service (NWS) graphical forecast, can result in acceptable predictions they can rely on National Geophysical Data Center (NGDG) data (www.ngdc.noaa.gov), which means that in some cases weather forecasters have analyzed and run the source data through their own custom models before making their predictions which can add personal feelings to the analysis which may reduce accuracy. Forecasting cloud formation is extremely difficult, and so an alternate method has been developed to augment the NGDG data and go one step closer to the source models by using relative humidity data directly from the source models. This method can yield better predictions for longer time periods, such as those beyond 12 or 24 hours in both a regional or countrywide capacity. Cloud height can be determined using % relative humidity data for altitude levels and a method is shown in FIG. 26. Once determined, the cloud height data can then be input into any of the algorithms that use cloud height as a data point. One method is shown in FIG. 24 where it segments the clouds up into Low/Medium/and High for analysis.

Relative Humidity data as obtained from NOAA sources can provide more information than cloud cover or cloud height alone. It can be combined with cloud layer and coverage information to inform photographic conditions. An example of this method can be seen in FIG. 22.

Marine Layer Adjustment

Figure 32:
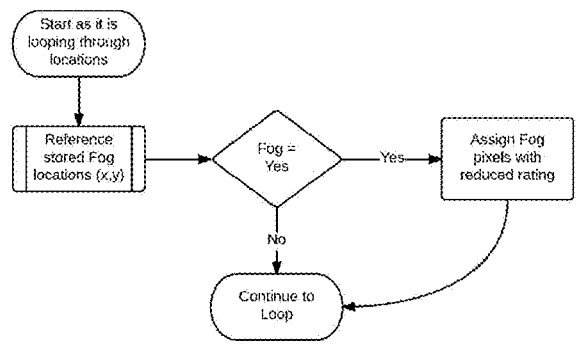
FIG. 32 is a flow diagram showing a method for using nested loops with fog analysis.

In coastal areas the marine layer, such as fog or haze, plays an important part in how nice or pleasing a sunrise or sunset will be. Typically events are more vibrant in the winter when the marine layer stays offshore or dissipates. The surface level clouds or fog must be tracked and integrated into the algorithm. One source of this data is the NOAA graphical forecast, which shows fog as a separate colored map layer. The data may be imported as a tabular set of points correlated to GPS locations, or as an image file where the fog may be separated out and used in the analysis. Another source of the marine layer data is the relative humidity charts, either isographs based on ground level pressure or a vertical sounding based plot which are well known to experts in the field of weather forecasting. An assumption based on the temperature and saturation can be made of the likely presence of a marine layer if there is between 80-90% relative humidity at ground level pressure altitudes, typically 1000 mb. This estimated value will be good for most marine layer cases. The actual dew point can be calculated and used to determine a more exact solution to the marine layer extent. The methodology used is similar to the standard cloud offset model and is shown in FIG. 31 where it goes through the process of importing fog data as an image file, parses the data into layers, then applies the shift method and down rates locations where fog is likely to be present, and then displays the results. This method is equally valid if you use a numerical set for source data instead of a picture. FIG. 32 shows fog analysis as a separate process where the resulting forecast is analyzed after the core method is run and down rated if fog is present.

Cloud Offset Method Using Cloud Density

Figure 25:
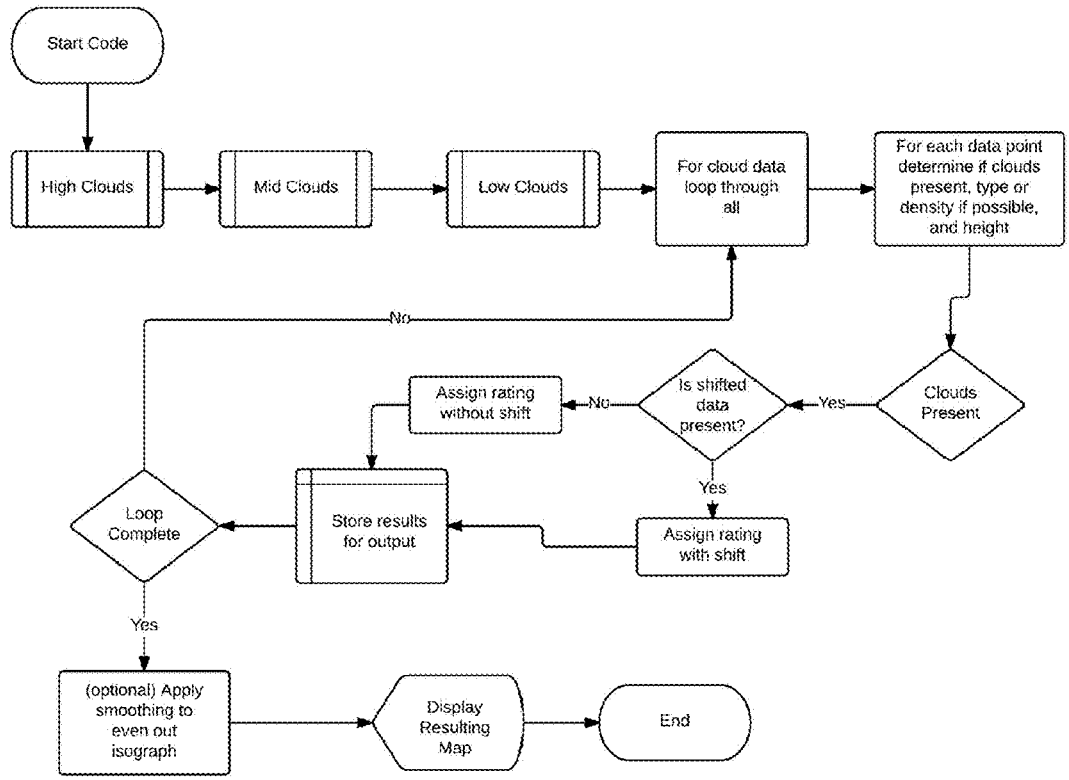
FIG. 25 is a flow diagram showing a high level overview of a method to use relative humidity to determine if clouds are present and assign a rating.
Figure 34:
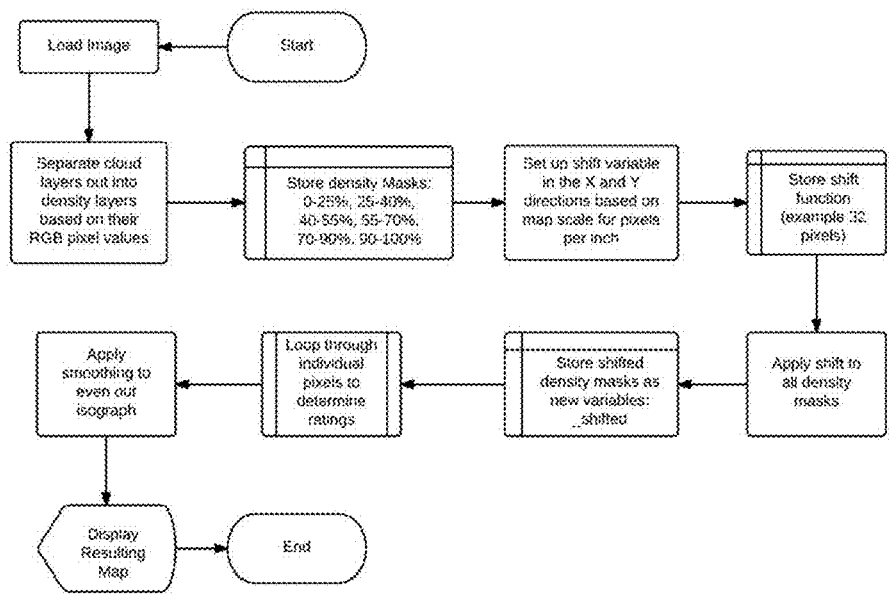
FIG. 34 is a flow diagram showing a high level overview of the offset method using density values to determine cloud cover.

The goal of the cloud offset method is to provide compensation for the masking effects of existing clouds or other features, which can impact golden hour light by blocking sunlight from clouds over the forecast location. Offset will vary by cloud height (in miles) and data resolution (in pixels or matrix values) and one embodiment is shown in FIG. 24 and another in FIG. 34. Once the data is shifted it can be utilized by the main method to determine if light will be blocked as shown in FIG. 25 where cloud heights are segmented into Low, Middle, and High. In some cases the offsets may result in reference areas where no data exists. The method must take no-data areas into consideration, and two options for this solution include (1) assuming clear skies or the preferred method (2) assuming a continuation of the available data around the edge of the image.

Figure 33:
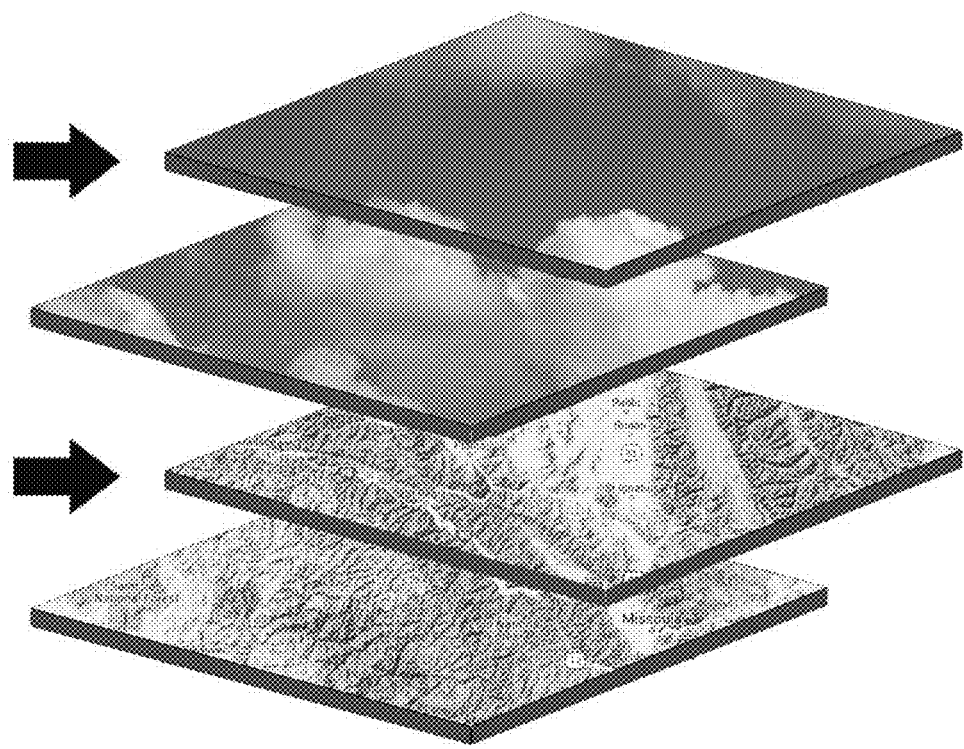
FIG. 33 is a diagram showing a method for shifting analysis data over an area of interest.

Aside from using the cast shadows mask, there is another way of looking at the cloud offset method is shown in FIG. 33. This is done by shifting duplicates of the base layer data and map items over the pixel representing the viewer location. As each layer gets shifted, the distance of the shift is recorded, and though in some instances the shifts may match, the resulting stack up allows the calculation of the probable light quality for that pixel by determining how the overhead and far cloud cover and or terrain interact with each other. This method can be used in any of the iterations and represents just one possible code methodology. This uses the same shift offset distances as the previously described method but they are negative with respect to the X and Y plane. The method chosen does not impact the method accuracy and simply a way of implementing the method in code which may vary from language to language.

Cloud Offset Method Using Cloud Density and Height

Figure 35:
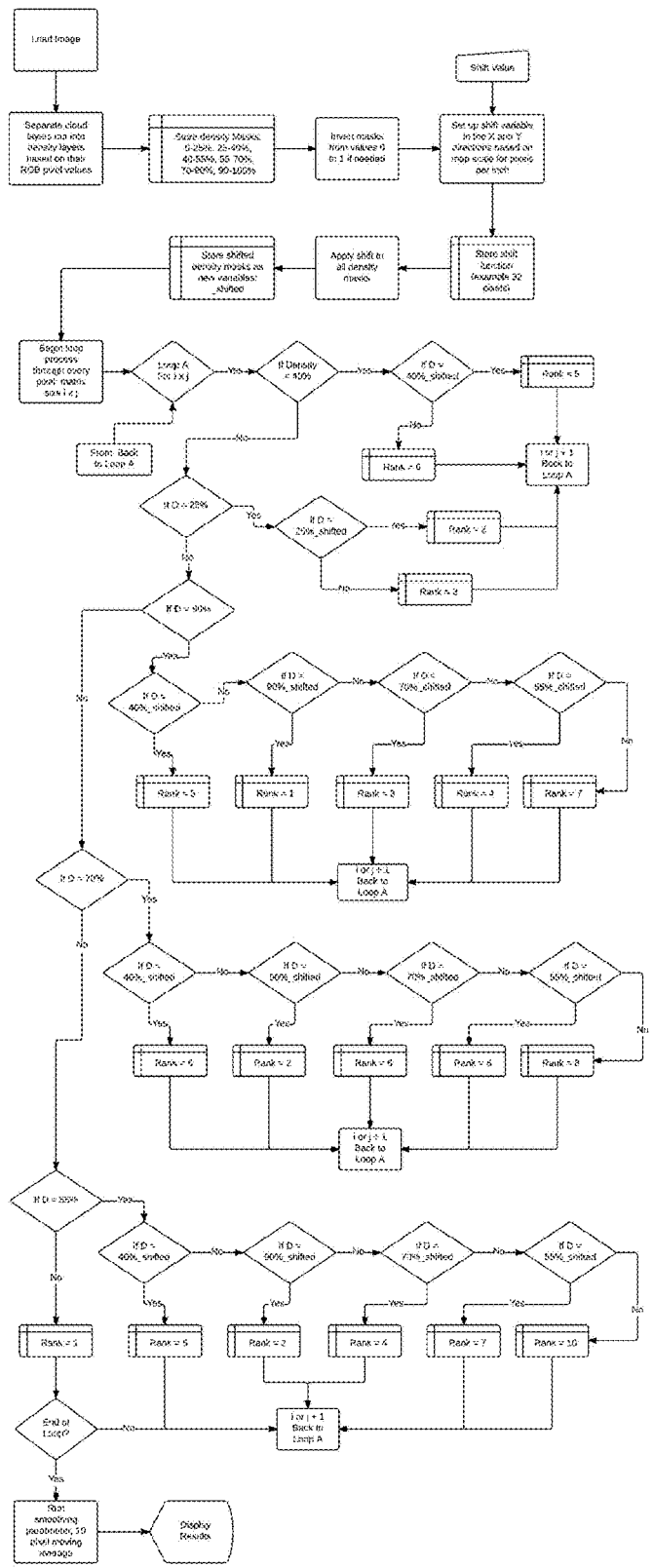
FIG. 35 is a flow diagram showing a method for offsetting data using cloud density as an input.
Figure 36:
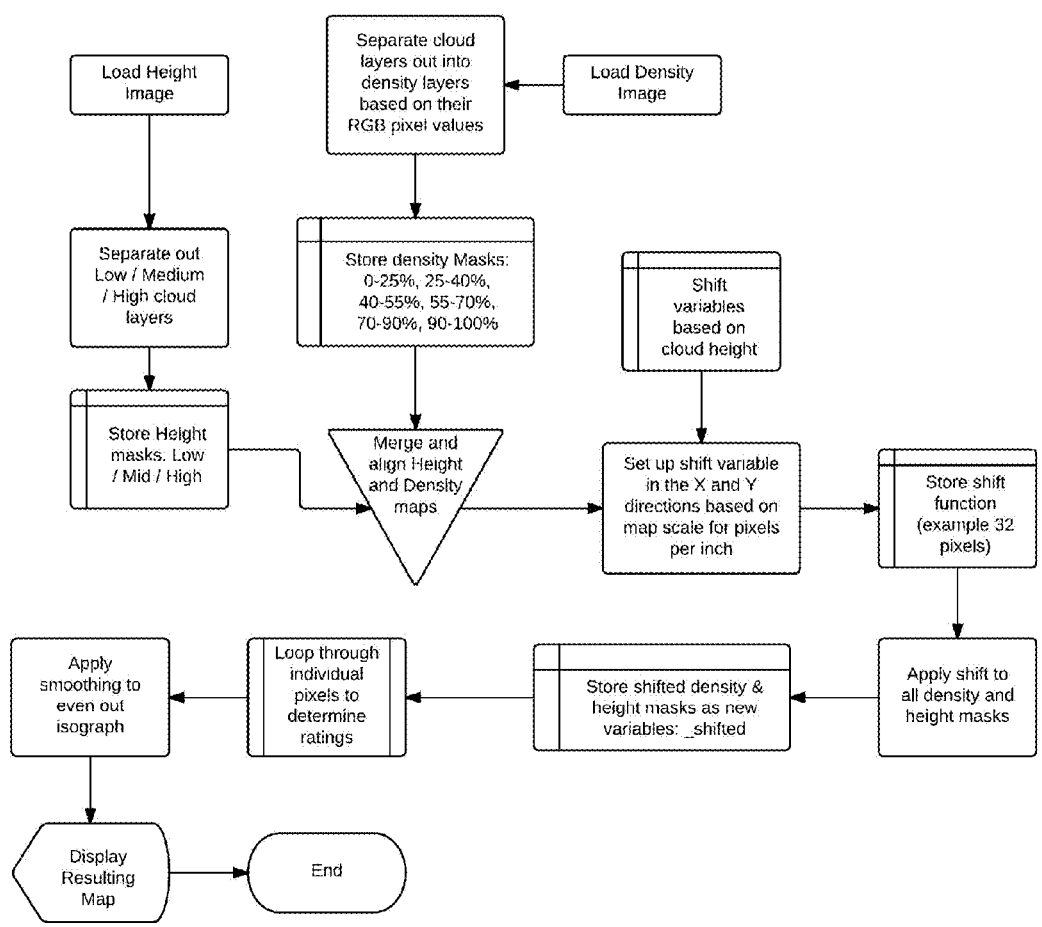
FIG. 36 is a flow diagram showing a high level method for determining rating based on cloud density and height by using offsets.

Both cloud density and cloud height can be used together for a more complete and accurate analysis of the sunrise or sunset conditions. Height and density information can be determined from any number of sources and then applied using this methodology. One embodiment of this method is shown in FIG. 35 and another in FIG. 36. When adding additional dimensions for the analysis the method increases in analysis time by running each cloud height loop relative to itself and the levels closest to it at both the forecast and offset locations. The method also cross checks masking for large differences in cloud altitudes relative to each other using an additional offset distance, for example when analyzing mid level clouds a large mass of low level clouds could impact the forecast rating if they block the sun between the cloud and the horizon, the distance will depend on their altitudes relative to each other and the cloud height thickness and density. The current shown output ranks are just one of many potential rating schemes which can be tuned to use, season, or location.

Using multiple sources of data typically requires an alignment step to account for variations in map projections or satellite imagery optical distortion. There are a number of standard methods for image alignment and correction that can be used and that are assumed to be common knowledge for the practitioner.

Determining Astrophotography Rating

Figure 38:
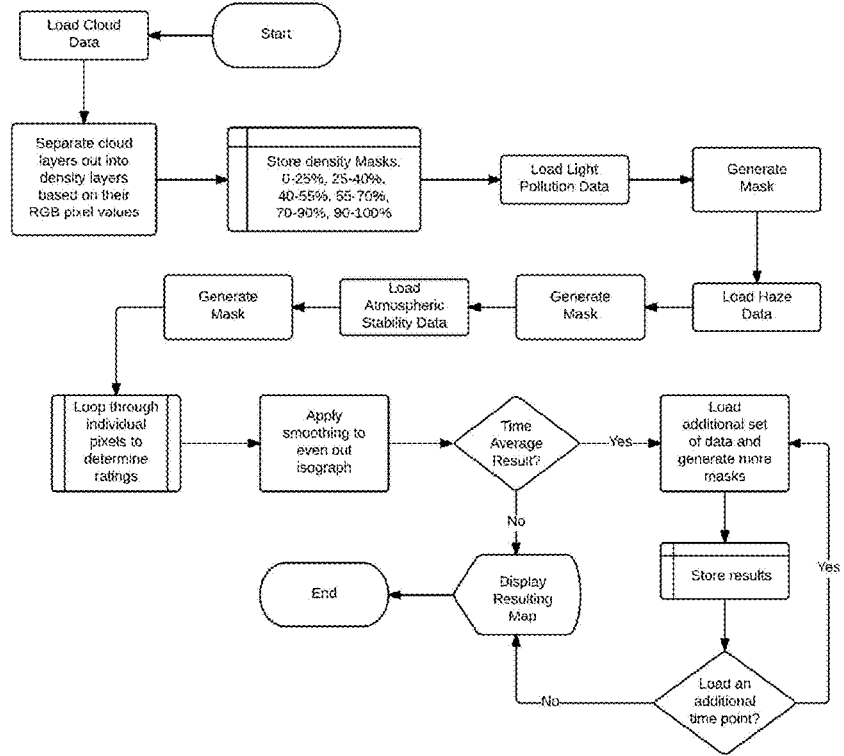
FIG. 38 is a flow diagram showing a method for determining how good the astronomical seeing is.

The algorithm may also be used to determine the quality of the viewing for astrophotography. At its simplest, this involves inverting the golden hour rating to the metric of: Fewer Clouds equals Better Rating. Corrections must also be applied for total cloud cover as a low ranking. Another potential iteration includes layers for light pollution, haze, or atmospheric stability. The Product is functional with or without some of these additional layers, and the layers may be added or excluded based on the users end requirements and the desired complexity of the program. A preferred embodiment of this method is shown in FIG. 38. Unlike the golden hour, where there is a set time and viewing conditions are optimal, astrophotography may be carried out at any point over the night. There are three choices to accommodate for this solution: (1) either multiple ratings may be generated for varying time increments, (2) the analysis may average ratings over the course of a night, or (3) a combination of the two.

This methodology may also be used to determine viewing opportunities for events such as solar or lunar eclipses, meteor showers, aurora, or other astronomy related phenomenon.

Thunderstorms and Cloud Thickness

Figure 41:
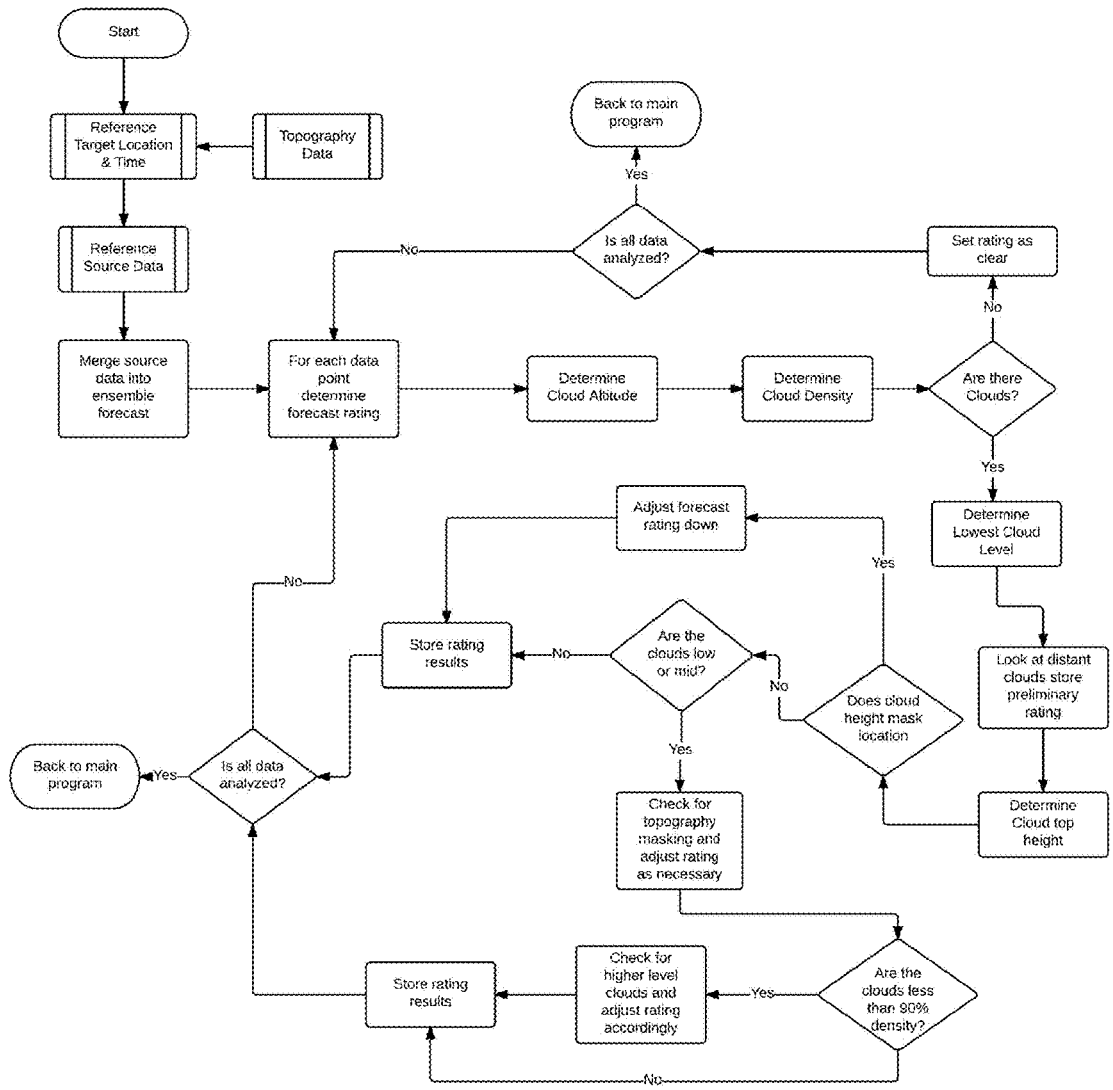
FIG. 41 is a method showing how cloud thickness can be considered in the forecast.

In certain instances, particularly during thunderstorms cloud thickness can increase from the average of several thousand feet up to tens of thousands of feet. This requires a modification of the forecast method to accommodate and retain accuracy, one such method is shown in FIG. 41. This shows that cloud thickness can be calculated and added to the analysis, where if it is above a value dependent on the height of the clouds at the forecast location, will influence the end result and lower the forecast value for a vibrant sunset, it is similar to the terrain masking where a high mountain casts a shadow in the area opposite it, a large cloud does the same. To calculate the cloud thickness two such methods are readily available using already generated NOAA data for cloud base and cloud top height or by forecasting thunderstorm formations by using indicators such as CAPE, which shows where large updrafts and instabilities are occurring.

Visibility Averages for Locations

Another option for displaying the method results to users is to create an area average visibility rating, where the user location, view distance, terrain, and System forecast are all taken into account. This provides an improvement in some situations as the visibility of the clouds relative to the user may vary depending on where they are or if they are interested in a total sky rating as opposed to a report which shows ratings directly over a location. In one embodiment of this method where the visibility for a location is calculated and the clouds visible in the sky from that location have their ratings averaged with a weighting factor based on how high above the horizon they are. The height above the horizon is determined through the cloud elevation and distance relative to the user, the higher above the horizon the clouds are the greater they will be weighted. Local terrain will also be incorporated so that if the user is in a valley surrounded by mountains, the height and distance of the mountains relative to their location will be used to create a mask which negates the clouds it blocks from the rating.

As used in this application, the term "about" or "approximately" is defined to mean +/−10%. The term "location" is defined to include an area defined by the system that includes a particular point, plus an area of surroundings that are deemed by the system to be part of that particular point, in one embodiment an area that is approximately 12 km in diameter, although this may vary depending upon the particular implementation of one skilled in the art. The term "surrounding area" is defined to include an area abutting the location, and extending a distance away from the location far enough to include a horizon distance from any clouds located above the location (which, depending upon the height of the clouds, may be a short distance if the clouds are low, and may also be several hundred miles if the clouds are very high). The term "time of sunset" is defined to mean "at or around the time of sunset" which is defined to include a suitable amount of time during which the clouds at the location may be illuminated for optimal photography, a length of time that varies depending upon particular conditions at the location, and is typically about 20-40 minutes around the actual time of sunset relative to the observer. The phrase "the sun is about 6 degrees of the horizon" is defined to include any point around sunset or sunrise at which colorful illumination of clouds is likely, according to the prevailing conditions, as known to those skilled in the art, typically 0-6 degrees from the horizon relative to the clouds being illuminated.

It is to be understood that the above-provided disclosure provides many different embodiments or examples for implementing different features of various embodiments of the invention. Although exemplary configurations components and methodologies for practicing embodiments of the invention are described below, the described embodiments are intended to be only exemplary of the invention and not intended to be limiting upon the scope of the invention. Additionally, the present disclosure may repeat reference numerals and/or letters in describing the various exemplary embodiments of the invention in several Figures noted above. However, this repetition is merely for the purpose of simplicity and clarity, and is not intended in itself to represent a relationship between the various embodiments and/or configurations discussed herein. Moreover, the invention, is not limited to any specifically described embodiment or configuration of elements. Rather, any combination of the following features and elements, whether related to a described embodiment or not, may be used to implement and/or practice the invention.

Additionally, in various embodiments, the invention may provide advantages over the prior art; however, although embodiments of the invention may achieve advantages over other possible solutions and the prior art, whether a particular advantage is achieved by a given embodiment is not intended in any way to limit the scope of the invention. Thus, the following aspects, features, embodiments, and advantages are intended to be merely illustrative of the invention and are not considered elements or limitations of the appended claims; except where explicitly recited in a claim. Similarly, references to "the disclosure" herein should neither be construed as a generalization of any inventive subject matter disclosed herein nor considered an element or limitation of the appended claims, except where explicitly recited in a claim.

As used in this application, the terms computer, processor, memory, and other computer related components, are hereby expressly defined to include any arrangement of computer(s), computer processor(s), computer memory device or devices, either as a single unit or operably connected and/or networked across multiple computers (or distributed computer components), to perform the functions described herein, as known by those skilled in the art.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Also, the terms "APP," "Product", "Program" and similar terms are defined to mean "the Invention" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A prediction system for forecasting conditions for photography about a time of sunrise or about a time of sunset, the prediction system comprising a computer system having one or more computer devices and computer memory which interact with a user device used by a user of the system, the computer memory storing executable code that, when executed, enables the computer system to perform a process that comprises the steps of:
   determining a location of interest;
   collecting weather forecast data at or about twenty to forty minutes within a time of either sunrise or sunset, at the location and a surrounding area adjacent the location via the computer system, wherein the computer system collects the weather forecast data at a plurality of particular intervals in view of an update to the weather forecast data, the collected weather forecast data comprising:
   cloud density; and
   cloud altitude;
   constructing a three-dimensional model of an atmosphere and a surrounding terrain in view of the collected weather forecast data by referencing the location of interest with surrounding topographical information retrieved from a database and by segmenting cloud altitudes into a plurality of categories including low clouds, medium clouds, and high clouds;
   determining whether there will be clouds at the location and whether sunlight will be obstructed by obstructing clouds in the surrounding area between the sun and the clouds at the location to determine conditions for photography at or about twenty to forty minutes within the time of either sunrise or sunset by determining a relative altitude of the location of interest with regards to the surrounding terrain between the location of interest and the sun;
   determining a forecast rating of forecast conditions for photography at or about twenty to forty minutes within the time of either sunrise or sunset based upon the clouds at the location and presence of any obstructing clouds;
   generating an overlay of the forecast rating, generated from the multiple categories of cloud layers including the low clouds, the medium clouds, and the high clouds, onto a four-dimensional map, having a horizontal axis X and Y, a vertical axis Z, and time, via the computer system in view of a first update to the forecast data at a first of the plurality of particular intervals, wherein the overlay visually indicates the forecast rating in view of a first color shade at the location;
   reporting the forecast rating via a first alert sent to a user device in response to the forecast rating exceeding a user selected threshold value, wherein the user device is configured to display the overlay onto the four-dimensional map;
   updating the overlay of an updated forecast rating onto the four-dimensional map via the computer system in view of a second update to the forecast data at a second of the plurality of particular intervals, wherein the overlay visually indicates the updated forecast rating in view of a second color shade at the location; and
   reporting the updated forecast rating, via a second alert sent to the user device in response to the forecast rating exceeding the user selected threshold value, wherein the user device is configured to display the overlay onto the four-dimensional map, so that a user can determine whether to plan photography at the location.

2. The prediction system of claim 1, wherein the weather forecast data is in METAR format.

3. The prediction system of claim 1, wherein the weather forecast data is in grib, grib2, or graphical format.

4. The prediction system of claim 1, wherein the cloud density is selected from the group consisting of overcast, broken, scattered, few, and none.

5. The prediction system of claim 1, wherein the cloud density is in a form of a percentage.

6. The prediction system of claim 1, wherein the computer system determines the forecast rating at a plurality of the locations, and the prediction system further comprises the step of generating the overlay of an associated forecast ratings onto the four-dimensional map, the overlay functioning to visually indicate a projected quality of conditions for photography.

7. The prediction system of claim 6, wherein the overlay includes different colors to indicate the forecast ratings at each of the plurality of the locations.

8. The prediction system of claim 1, further comprising the step of determining a time at which the sun is 1 to 6 degrees of the horizon relative to the clouds at the location.

9. The prediction system of claim 8, wherein the step of determining whether there are any clouds in the surrounding area between the sun and the clouds at the location is performed at the time at which the sun is 1 to 6 degrees of the horizon relative to the clouds at the location.

10. The prediction system of claim 1, further comprising the step of determining whether there will be cloud color at the location in view of the constructing the three dimensional model.

11. A prediction system for forecasting conditions for photography about a time of sunrise or about a time of sunset, the prediction system comprising a computer system having one or more computer devices and computer memory which interact with a user device used by a user of the system, the computer memory storing executable code that, when executed, enables the computer system to perform a process that comprises the steps of:
    determining a location of interest;
    collecting weather forecast data at or about twenty to forty minutes within a time of either sunrise or sunset, at the location and a surrounding area adjacent the location via the computer system, wherein the computer system collects the weather forecast data at a plurality of particular intervals in view of an update to the weather forecast data, the collected weather forecast data comprising:
    cloud density; and
    cloud altitude;
    constructing a three-dimensional model of an atmosphere and a surrounding terrain in view of the collected weather forecast data by referencing the location of interest with surrounding topographical information retrieved from a database and by segmenting cloud altitudes into a plurality of categories including low clouds, medium clouds, and high clouds;
    determining a direction of sunlight at or about twenty to forty minutes within the time of either sunrise or sunset;
    determining whether there will be clouds at the location and whether sunlight will be obstructed by obstructing clouds in the surrounding area between the sun and the clouds at the location to determine conditions for photography at or about twenty to forty minutes within the time of either sunrise or sunset by determining a relative altitude of the location of interest with regards to the surrounding terrain between the location of interest and the sun;
    determining a forecast rating of forecast conditions for photography at or about twenty to forty minutes within the time of either sunrise or sunset based upon the clouds at the location and presence of any obstructing clouds;
    repeating the above-described steps for a plurality of locations;
    generating an overlay of the forecast rating, generated from the multiple categories of cloud layers including the low clouds, the medium clouds, and the high clouds, onto a four-dimensional map, having a horizontal axis X and Y, a vertical axis Z, and time, via the computer system in view of a first update to the forecast data at a first of the plurality of particular intervals, wherein the overlay visually indicates the forecast rating in view of a first color shade at one of the plurality of locations;
    providing, to the user device for display, the first overlay for use with the four-dimensional map, the first overlay functioning to visually indicate the forecast ratings at the one of the plurality of locations;
    updating the overlay of an updated forecast rating onto the four-dimensional map via the computer system in view of a second update to the forecast data at a second of the plurality of particular intervals, wherein the overlay visually indicates the updated forecast rating in view of a second color shade at the one of the plurality of locations; and
    providing, to the user device for display, the overlay for use with the four-dimensional, the overlay functioning to visually indicate the forecast ratings at the one of the plurality of locations, wherein a user can determine whether to plan photography at the one of the plurality of locations in view of the overlay.

12. The prediction system of claim 11, further comprising the step of determining a time at which the sun is 6 degrees of the horizon of the clouds at the location.

13. The prediction system of claim 12, wherein the step of determining whether there are any clouds in the surrounding area between the sun and the clouds at the location is performed at the time at which the sun is 6 degrees of the horizon of the clouds at the location.

14. The prediction system of claim 11, further comprising the step of checking for obstructing terrain.

15. The prediction system of claim 11, wherein clouds at higher altitudes are assigned a greater weight than clouds at lower altitudes.

16. The prediction system of claim 11, further comprising a forecast rating system that separates light an hour before sunset from light forty-five minutes after sunset.

17. The prediction system of claim 11, further comprising a reporting system wherein alerts are sent out to the user based on user location and the forecast results.

18. A prediction system for forecasting conditions for photography about a time of sunrise or at about a time of sunset, the prediction system comprising a computer system having one or more computer devices and computer memory, the computer memory storing executable code that, when executed, enables the computer system to perform a process that comprises the steps of:
    collecting, via the computer system, weather forecast data at or about twenty to forty minutes within a time of either sunrise or sunset at a location of interest, the collected weather forecast data comprising humidity at various cloud altitudes, wherein the computer system collects the weather forecast data at a plurality of particular intervals in view of an update to the weather forecast data;

constructing a three dimensional model of an atmosphere and a surrounding terrain in view of the collected weather forecast data by referencing the location of interest with surrounding topographical information retrieved from a database and by segmenting the various cloud altitudes into a plurality of categories including low clouds, medium clouds, and high clouds;

determining whether there will be clouds at the location to determine conditions for photography at or about twenty to forty minutes within the time of either sunrise or sunset by determining a relative altitude of the location of interest with regards to the surrounding terrain between the location of interest and the sun, the determination giving greater weight to humidity at higher altitudes that at lower altitudes;

determining a forecast rating of forecast conditions for photography at or about twenty to forty minutes within the time of either sunrise or sunset;

generating an overlay of the forecast rating, generated from the multiple cloud layers including the low clouds, the medium clouds, and the high clouds, onto a four-dimensional map, having a horizontal axis X and Y, a vertical axis Z, and time, via the computer system in view of a first update to the forecast data at a first of the plurality of particular intervals, wherein the overlay visually indicates the forecast rating in view of a first color shade at the location;

providing, to a user device for display, the overlay for use with the four-dimensional map, the overlay functioning to visually indicate the forecast ratings at the location;

updating the overlay of an updated forecast rating onto the four-dimensional map via the computer system in view of a second update to the forecast data at a second of the plurality of particular intervals, wherein the overlay visually indicates the updated forecast rating in view of a second color shade at the location; and providing, to the user device for display, the overlay for use with the four-dimensional map, the overlay functioning to visually indicate the forecast ratings at the location so that a user can determine whether to plan photography at the location.

19. The prediction system of claim 18, wherein the overlay use a plurality of colors comprising at least red and blue to indicate various corresponding forecast ratings.

* * * * *